March 27, 1956 L. H. FACER 2,739,886
PROCESSES FOR PRODUCING FERTILIZERS AND THE PRODUCTS THEREOF
Filed Feb. 25, 1942 9 Sheets-Sheet 1
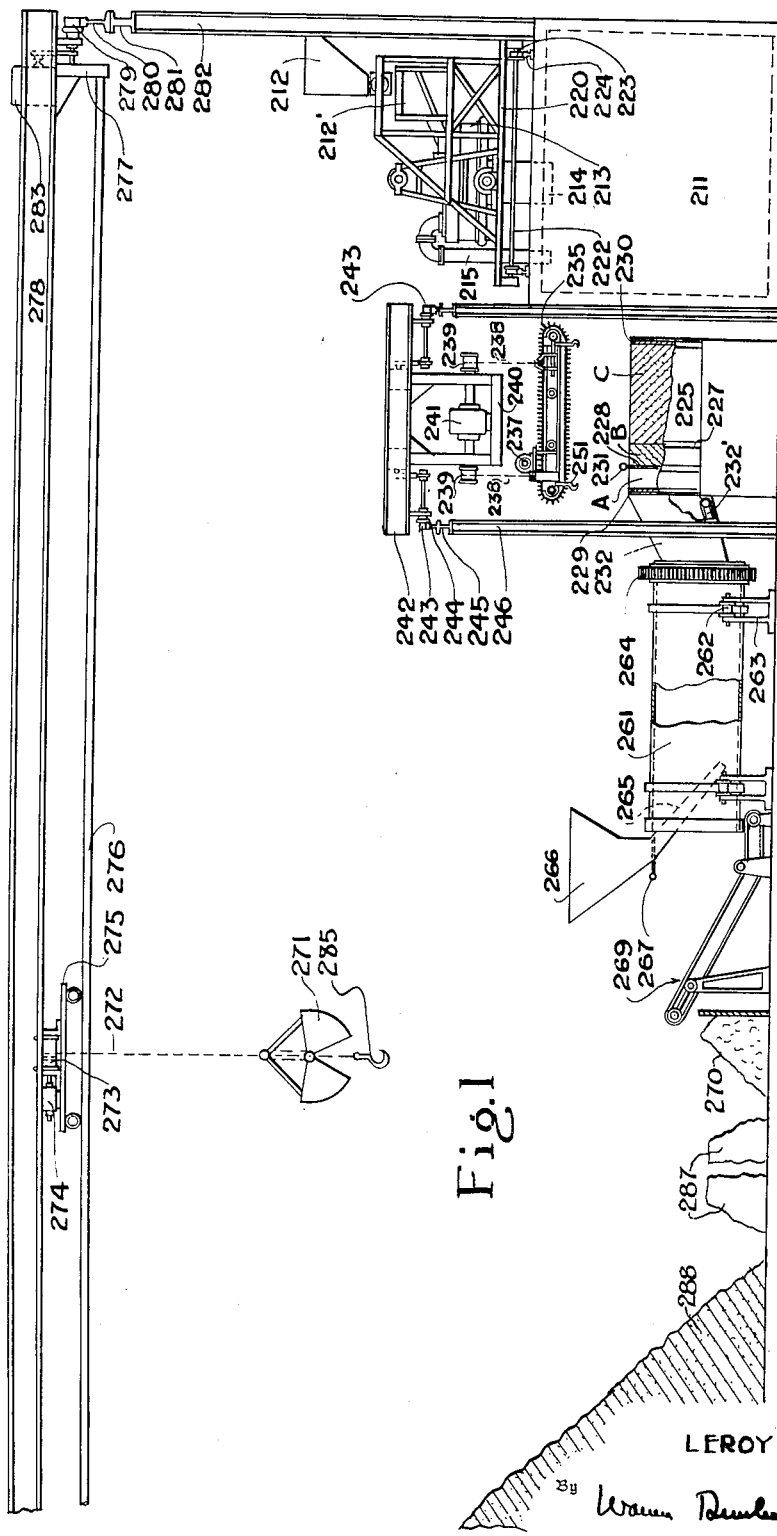
Inventor
LEROY HENRY FACER
Attorney March 27, 1956
L. H. FACER
2,739,886
PROCESSES FOR PRODUCING FERTILIZERS AND THE PRODUCTS THEREOF
Filed Feb. 25, 1942
9 Sheets-Sheet 2
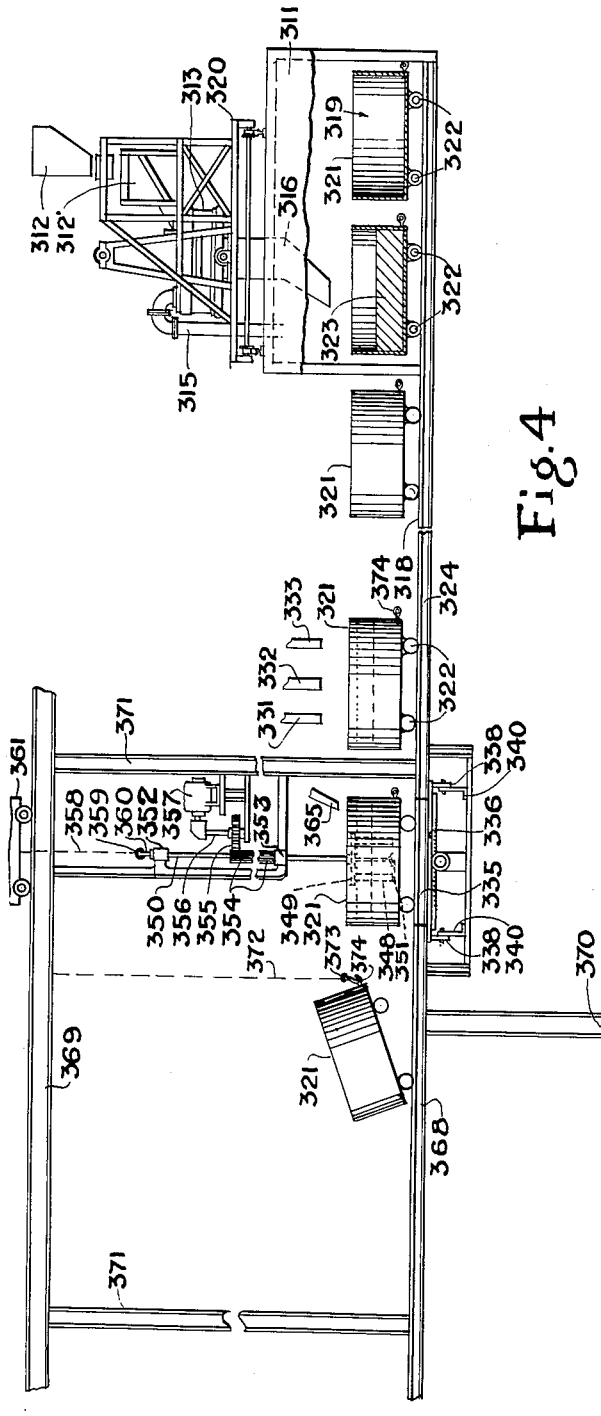
Fig.4
Fig.5
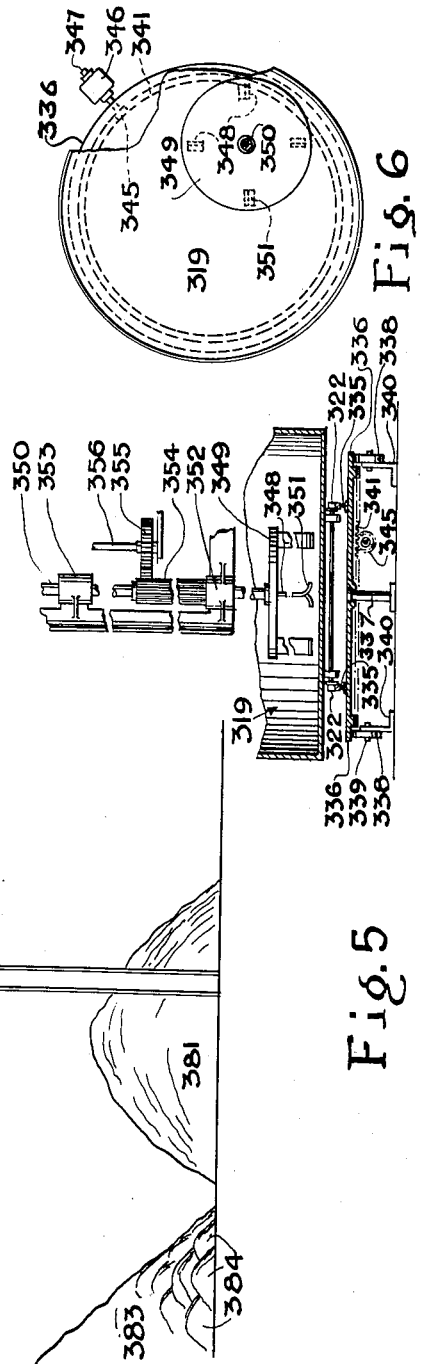
Fig.6
Inventor
LEROY HENRY FACER
By [signature]
Attorney March 27, 1956 L. H. FACER 2,739,886
PROCESSES FOR PRODUCING FERTILIZERS AND THE PRODUCTS THEREOF
Filed Feb. 25, 1942 9 Sheets-Sheet 3
Fig. 7
Fig. 8
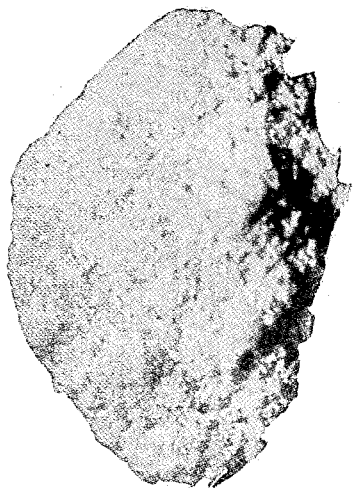
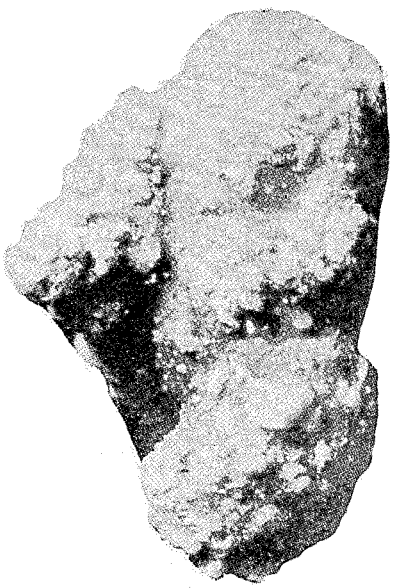
Fig. 9
Fig. 10
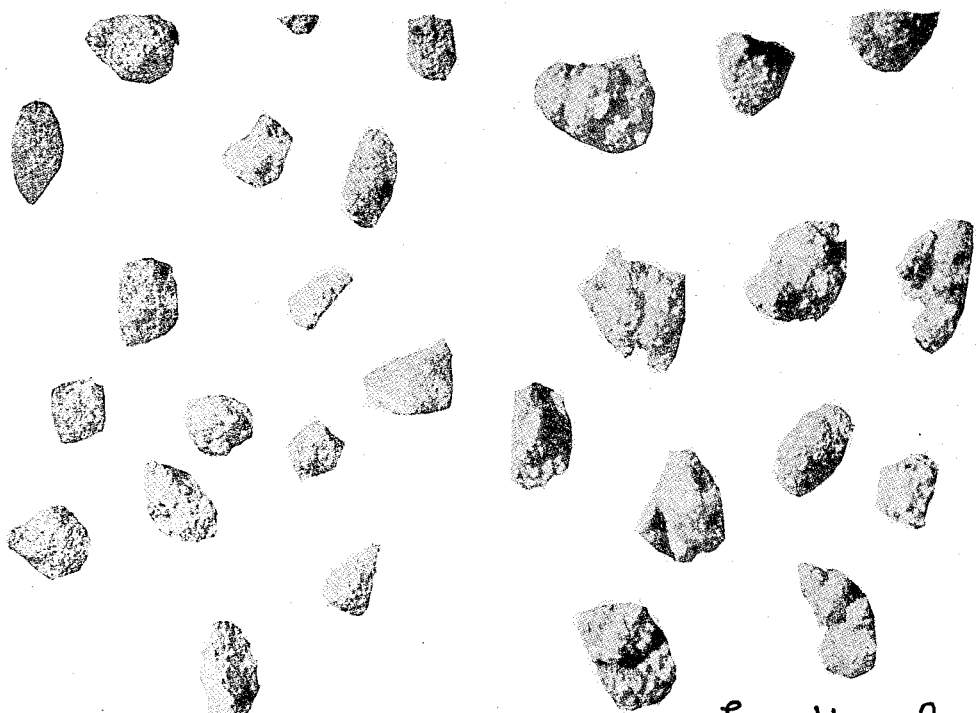

March 27, 1956   L. H. FACER   2,739,886
PROCESSES FOR PRODUCING FERTILIZERS AND THE PRODUCTS THEREOF
Filed Feb. 25, 1942   9 Sheets-Sheet 9

United States Patent Office 2,739,886
Patented Mar. 27, 1956

2,739,886

PROCESSES FOR PRODUCING FERTILIZERS AND THE PRODUCTS THEREOF

Leroy Henry Facer, Phelps, N. Y., assignor, by mesne assignments, to Glen E. Cooley, Schenectady, N. Y., Warren Dunham Foster, Ridgewood, N. J., Halfdan Gregersen, New York, N. Y., Magnus I. Gregersen, Englewood, N. J., and Dana S. Lamb, New York, N. Y., trustees Application February 25, 1942, Serial No. 432,350

18 Claims. (Cl. 71—64)

This invention is particularly useful in producing fertilizers containing phosphorous with or without other elements beneficial to the plant but in certain aspects it is applicable to the production of products not containing phosphorous. By "fertilizers" I mean any product which promotes plant growth including minor elements and hormones as well as nitrogen, phosphorous and potash.

RELATION TO OTHER APPLICATIONS

This application is a continuation-in-part of my applications Serial Number 338,987, filed June 5, 1940, Serial Number 242,121, filed November 23, 1938, Serial Number 206,291, filed May 5, 1938, and Serial Number 112,372, filed November 23, 1936, all of which are co-pending herewith. Said application Serial Number 112,372 is a continuation-in-part of application Serial Number 98,227, filed August 27, 1936, patented September 3, 1940, as Number 2,213,243, and of application Serial Number 709,411, patented November 24, 1936, as Number 2,061,- 567, and was co-pending with both of said patented applications, said application Serial Number 98,227 also being a continuation-in-part of said application which was patented as Number 2,061,567 and having been co-pending therewith. Said application Serial Number 338,987 is a continuation-in-part of said application Serial Number 112,372 and of said application patented as Number 2,213,243 and was co-pending with both thereof. Said application Serial Number 242,121 is a continuation-in-part of said application Serial Number 206,291 and was co-pending therewith, said application Serial Number 206,291 in turn being a continuation-in-part of said application Serial Number 112,372 and said application patented as Number 2,213,243 and being co-pending with both thereof.

OBJECTS

A preliminary statement of the objects of this invention includes:

1. A product of much improved physical condition for handling, shipment, delivery and application to the soil. This product may be in forms known in this art as either pelleted (retained on a screen of say twenty mesh to the inch or larger) or granular (able to pass through a screen of say twenty and retained on one of sixty mesh).

2. A product, in physical and chemical condition to be shipped to and used by a farmer, which per unit of plant food results in greatly increased crop-production.

3. Lowered cost of manufacture by use of less labor, less acid in proportion to "available phosphoric acid" produced, less expensive materials and smaller quantities of certain materials and simpler and less expensive facilities thus requiring less capital.

These three generally defined objects while capable of use entirely independently of each other are preferably combined. If full use is made hereof it is possible for less cost to produce a fertilizer of better physical condition which grows more and better crops, but if desired inventive elements hereof may be used separately.

The products of my invention as usable by the farmer and the processes of making them are distinctly different from the prior art inter alia because of their high true water-solubility which I believe in quantity is critical and novel in quality completely unknown in this art. My truly water-soluble phosphorous-bearing product both while in the complex of a superphosphate or mixed fertilizer when ready for sale or in the ground includes an acid salt or salts in which the hydrogen atoms remain in true combination with phosphorus (and when in solution the $H^+$ ion is ready for combination to form other acid salts) with the result that fixation or change to a compound indigestible by plant life is avoided or long delayed.

GENERAL DESCRIPTION OF PROCESS

To produce a superphosphatic fertilizer I mix ground phosphate rock and an acid, generally but not necessarily sulphuric, in the usual way, with or without then adding other fertilizer ingredients, and pour the resulting mixture into a conventional or a novel receptacle known as a den. After solidification I may either remove this material from the den, or, in a novel den in a novel manner add other fertilizer ingredients and then mix all. I prefer, after the mixture of phosphate rock and acid has set and while it is still moist and warm but before it has cured, to form it into pellets and to coat the pellets while still moist from the mixing operation with a dry absorptive material, said coating alone being effective to preserve the identity of the pellets thereafter. I also prefer to maintain within the pellets as free moisture and water of crystallization substantially all of the moisture so that optimum hydration and crystallization take place and also so handling the pellets that the temperature thereof during and after their formation decreases relatively rapidly. After the material is removed from the den the complete practice of this invention demands that its temperature must decrease substantially continuously. It is necessary that the product be not dehydrated and that the water necessary for crystallization be maintained available for the chemical reactions peculiar to my finished product, if my full and characteristic results are to be secured. Heating after ex-denning—or in the absence of substantially consistent and rapid cooling—is disadvantageous per se and is one form of dehydration, which is destructive of my characteristic product. Other forms of dehydration including vacuum drying by an autoclave or otherwise and even continued aeration as by repeated crane movements, long continued rolling in a pelleting or other drum or a long continued current of cool air causes destructive dehydration, as does a shorter period of application of high heat. Alternatively I may mix cured superphosphate with other fertilizing materials and in the presence of moisture pellet the resulting combination. Some salt present must have the capacity to take up water of crystallization. My finished product so far as I know is entirely unique in this art in that it has substantially the same amount of total moisture—that is free moisture plus water of crystallization—as appears in the freshly denned or freshly mixed materials respectively from which the product is made. The drying or curing of pellets of the prior art is accompanied by loss of moisture. Such drying or curing of my pellets, however, does not reduce moisture. Pellets made in accordance herewith fresh from the pelleting operation immediately placed in a hermetically sealed vessel become bone dry, the water still being present but in combined form.

While I prefer to form a pelleted product, the practice of this invention also results in a greatly improved product in granular as distinct from a pelleted form.

Other advantages, objects and characteristics than those stated in the preceding and following portions of this specification are apparent from the following and preceding description, the attached drawings, and the subjoined claims. Although I am showing preferred embodiments of my invention and stating preferred products methods and steps, it will be readily understood that I am not in any way limited thereto, as changes can be readily made without departing from the spirit of the invention or the scope of my broader claims.

DESCRIPTION OF DRAWINGS

In the drawings:

Figure 1 illustrates my invention in a crane plant.

Figure 2 is an enlarged detailed side view of an operative interconnection between my digging machine and a wall of a mixing chamber.

Figure 3 is an end view corresponding to Figure 2.

Figure 4 illustrates, partly in section and partly broken away, a modification as in a plant with special movable dens.

Figure 5 is a detailed end view largely in section of a mixing and pelleting unit for such a plant.

Figure 6 is a top plan view corresponding to Figure 5.

Figure 7 is a reproduction of a photomicrograph enlarged approximately thirty diameters of the exterior of my single simple pellet of superphosphate and a type herein called a "closed pellet."

Figure 8 is a reproduction of a photomicrograph enlarged approximately thirty diameters of the exterior of my "closed pellet" of aggregate form made up of a plurality of smaller simple pellets which have adhered to each other.

Figure 9 is a reproduction of a photomicrograph enlarged approximately six diameters of a group of closed pellets of the type shown in Figure 7.

Figure 10 shows a group of closed pellets of an aggregate or compound form.

Figure 19: My superphosphate by ammonium molybdate;

Figure 20: A standard mixture of monocalcium phosphate and calcium hypophosphite by ammonium molybdate;

Figures 21, 22 and 23: Three forms of conventional superphosphate by ammonium molybdate;

Figures 24, 25 and 26: Three forms of a standard mixture of monocalcium phosphate, dicalcium phosphate and calcium pyrophosphate by ammonium molybdate;

Figure 27: My characteristic product by hexamine cobaltic chloride;

Figure 28: A standard mixture of monocalcium phosphate and calcium hypophosphite by hexamine cobaltic chloride;

Figure 29: A standard mixture of conventional superphosphate by hexamine cobaltic chloride;

Figure 30: A standard mixture of monocalcium phosphate, dicalcium phosphate and calcium pyrophosphate by hexamine cobaltic chloride;

Figure 31: My product by ammonium chloride;

Figure 32: A standard mixture of monocalcium phosphate and calcium hypophosphite by ammonium chloride;

Figure 33: Conventional superphosphate by ammonium chloride.

Figure 34: A standard mixture of monocalcium phosphate, dicalcium phosphate and calcium pyrophosphate treated by ammonium chloride.

Figure 35, enlarged eight diameters, shows my product treated with ammonium molybdate and corresponds to the photomicrograph reproduced as Figure 19.

Figure 36 is of a standard mixture of calcium hypophosphite and calcium monophosphate and corresponds to the microscopic photographs of Figure 20.

Figure 37, enlarged eight times, shows a water-extract of conventional superphosphate treated with ammonium molybdate and corresponds to microscopic reproductions of Figures 21, 22 and 23.

Figure 38 is similar to Figure 37 but is of a water-extract of a standard mixture of monocalcium phosphate dicalcium phosphate and pyrophosphate treated with ammonium molybdate and corresponds to the microscopic photographs of Figures 24, 25 and 26.

Figure 11:
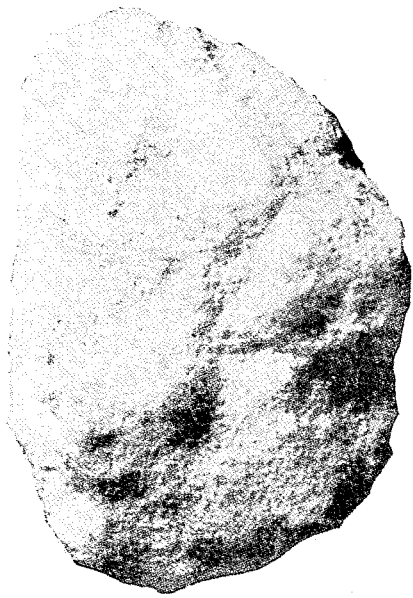
Figure 11 is a reproduction of a photomicrograph enlarged approximately thirty diameters of a conventional hard and fired pellet.

The stated enlargement of the several figures refers to the size of the figures as filed herewith and not as printed.

WATER-SOLUBILITY

Understanding of this invention demands exact use of the terms "water-soluble" and "water-solubility." Distinction must be made between water-extractability and water-solubility. Any substance which in whole or in part disappears when mixed with water in varying quantities has been loosely called "water-soluble" whether resulting from simple solution or decomposition. I use the terms "water-soluble" and "solubility" in the meaning commonly accepted by scientists and not in the common loose use of the fertilizer industry. I use "water-extractability" to include the capacity of a solid substance to have certain or all of its parts removed therefrom by and to disappear in water whether the resulting liquid, which I term a "water-extract," is a pure solution of the original solute or not.

A truly water-soluble fertilizer of calcium in combination with phosphorus and mixed fertilizers made therefrom have much greater crop-producing capacity than phosphatic fertilizers which are merely water-extractable because the latter when decomposed in water yields a phosphatic anion which combines with basic elements in the soil to form chemically stable compounds which resist assimilation by plants. My combination of anions from truly water-soluble calcium phosphates with basic elements forms a product generally readily and truly water-soluble and easily assimilable. My product in soil water yields an acid salt or salts in which the hydrogen atoms remain in true combination with phosphorus. Thus fixation or change to an indigestible compound is avoided or long delayed. The acid content of my product is only slightly higher than that of conventional and most closely comparable products, but the hydrogen ion concentration (instantaneous) in the product hereof is much greater. Consequently my products are not excessively acid as shown by titration as compared with other products, but in all dilutions they can call upon a greater reserve supply of hydrogen ions as shown by pH value.

UNCERTAINTIES CONCERNING SUPERPHOSPHATE

As long recognized in this industry, the chemistry of superphosphates and superphosphatic fertilizers and that of the phosphate rock generally used as its basis are complex and relatively little understood. In general chemistry with the exception of the few compounds which have been carefully purified for analytic and research work the available compounds of phosphorus including phosphoric acid are mixtures of many phosphatic compounds. Analyses of phosphate rock and superphosphate state the phosphorus present as an arbitrary and familiar phosphatic radical usually $PO_4$ or $P_2O_5$ which does not indicate the presence of that radical in the quantity stated or at all. Similarly metallic salts in phosphate rock are ordinarily reported as metallic oxides when in reality they are metallic phosphates or sulphides. This convention ordinarily is not objectionable, but with my novel product it is confusing because the form of phosphorus therein is in different and unusual combination which as well as the particular forms of phosphorus combine to give my product its peculiar and novel characteristics.

Nevertheless I define my characteristic and novel product in such definite terms—chemical, physical and optical—as result in its ready identification as well as an understanding of the steps by which it is obtained. While many factors in both product and process are not yet fully understood, this specification enables any one skilled in this art without experimentation completely to practice this invention.

In this industry it is assumed that the phosphorus content of superphosphate is monocalcium phosphate, dicalcium phosphate and tricalcium phosphate and that monocalcium phosphate is "soluble in water" (as it is not), dicalcium phosphate is "insoluble in water" but "soluble in weak acid" and tricalcium phosphate is practically speaking "insoluble." Such assumptions while convenient in this industry are contrary to scientific fact; see for example "Properties of Inorganic Substances" by Wilhelm Segerblom, The Chemical Catalog Company, Inc., 1927.

IMPORTANCE OF WATER-SOLUBILITY

Agronomists have long recognized that only a small portion of the phosphorus in commercial fertilizers is actually utilized by the plant, although a large portion of the nitrogen and potash is utilized. A plant ordinarily secures only between ten (an average of good farming practice) and twenty percent (which is exceptional) of all phosphorus properly applied in good commercial fertilizers.

Tests of my product have shown that per unit of phosphorus applied increases in plant growth have run from ten to three hundred percent. Such figures are to be taken as mean increases over the present utilization of from ten to twenty percent of the total so-called "available" phosphorus applied. I have recommended the use of the same quantity and analysis of mixed fertilizers as at present with the substitution, however, for the phosphorus-bearing materials previously employed of materials made in accordance herewith having approximately one-half as much "available" phosphorus according to conventional standards. Alternatively and as economically more desirable, the farmer may well use, for example, half his accustomed quantity with double the strength of nitrogen and potash and the accustomed nominal content of my phosphorus. For example, a truck grower previously using 1000 pounds per acre of a 4–8–4 may well substitute 500 pounds of my 8–8–8, the phosphorus content being supplied by this product. Under test such formulae ordinarily give better results than the previous ones with double the quantity of phosphorus calculated conventionally.

When monocalcium phosphate, which is water-soluble only to about two-tenths of one percent and is an acid salt, is placed in ordinary American soils, the phosphorus therein is decomposed by soil water and cannot be used. Dicalcium phosphate in the soil is water-soluble to about two one-hundredths of one percent and is largely stable and neutral and does not so combine, but the plant can utilize its phosphorous content only after digestion by its acids. Tricalcium phosphate, although an alkaline salt and truly water-soluble from two to three one-thousandths of one percent, is not soluble in the weaks acids of the soil and hence is of no practical value to the plant except over a long period. In all of these decompositions, including monocalcium phosphate in large part, whatever phosphoric acid is liberated ordinarily combines with metals or bases there present and forms other phosphates which are water-insoluble and not digestible by the plant.

When monocalcium phosphate is placed in water, a true solution results, but it is not pure and is not a solution of monocalcium phosphate. Instead, the decomposition of the monocalcium phosphate has resulted in a solution of monocalcium phosphate, dicalcium phosphate, tricalcium phosphate and phosphoric acid.

If a water-extract of ordinary superphosphate is evaporated, the resulting substance will be different from the original. A portion of the fraction of my product which resembles conventional will re-crystallize in the conventional manner.

When my product is placed in the soil its essential constituents as an acid salt or salts without decomposition go into a true water-solution and combine through double decomposition in large measure with substances there present to form other acid salts including metallic components which are in turn water-soluble and to a relatively great extent usable by the plant. The H+ ion remains in definite association with the phosphorus and forms an acid salt. After the recrystallization the product is the same as the original substance. So far as I am aware no previous practitioners have been able to maintain such a salt in an end product which can be or has been sold to the farmer and used by him, nor has its value previously been recognized nor have attempts been made to maintain such a salt, if present for a moment, in a form which is usable.

A somewhat similar process occurs in the manufacturing operation, as later explained.

"Available," "available phosphoric acid" and "insoluble" are used herein in accordance with the "Official and Tentative Methods of Analysis of the Association of Official Agricultural Chemists" and published by that body (fifth edition 1940), Washington, D. C. This is the basis upon which phosphatic products are sold in the United States and is supposed to reflect the ability of a plant to digest phosphorus by its own fluids in its environments in the soil. My use of "citrate-soluble" excludes "water-extractable." These terms represent phosphorus which is soluble in ammonium citrate. Irrespective of my preferred peculiar chemical constitutents, I can produce "available"—and hence salable—"phosphoric acid" more simply and cheaply than any others known to me.

The advance from primitive methods largely eliminated the reversion of water-extractable and citrate-soluble phosphate to phosphate insoluble in both water and standard ammonium citrate solution. An important object of this invention is to eliminate the change of water-extractable phosphate to citrate-soluble phosphate, simply and without elaborate or expensive apparatus or manipulation. A more important object is to produce and maintain truly water-soluble phosphorus.

The reaction between an acid and phosphate rock appears to produce only water-extractable phosphate which under the processes of others in this country later becomes in part citrate-soluble. A characteristic of this invention is the retention as water-extractable phosphate of a relatively very large percentage of that originally produced, generally well over 90% of the total phosphorus, without over-acidulation and an undue amount of free acid or the creation of a product which is gummy sticky and otherwise difficult to handle. Others have maintained a relatively large percentage of water-extractable phosphate as such but only at the cost of over-acidulation with its evil. So far as I know, however, no one has previously produced in condition for use and sale a fertilizer which includes phosphorus which is truly water-soluble, as distinct from water-extractable, to an extent greater than .2%.

Free acid remaining after my production of the original water-extractable phosphate as the cure progresses reacts with a portion of the remaining insoluble phosphate to form additional water-extractable phosphate. Therefore the water-extractable content of superphosphatic fertilizers made in accordance herewith actually increases during curing.

Many different analyses of my products as made at different times, in different places, under varying conditions taken from samples aged one, three and five weeks and eighteen months with rock of different B. P. L. have all shown substantially ninety percent of the total available phosphorus to be in water-extractable form.

A ratio of water-extractable to total phosphorus of at least eighty-five is secured in my product made of a stoichiometric mixture. If the ratio exceeds that of a stoichiometric mixture the ratio of water-soluble to total phosphorus remains at least eight-five. With relatively more rock and less acid, I still secure in product cured in accordance herewith a ratio in percent of water-soluble to available phosphorus of at least eight-five. That is, with under-acidulation I secure less water-soluble and less available phosphorus but equally well maintain the ratio between them.

So far as I know no prior product has maintained the water-extractable phosphate as sold to the farmer at its original level or has increased it during the curing processes. "A mature 'super' will always contain less P2O5 soluble in water than does a freshly prepared material," Parrish and Ogilvie, above cited, page 219.

FOREIGN PRACTICES

In many foreign countries superphosphate is sold on the basis of "water-soluble" (meaning "water-extractable" according to my terms) and total phosphoric acid, but in the United States it is quoted on the basis of "available phosphoric acid," the sum of water-extractable phosphorus and citrate-soluble phosphorus. Foreign superphosphatic fertilizers, sticky and gummy and containing high free acid, with high water-extractability have been produced by the use of relatively very much more acid than is employed here. Since sulphuric acid carries no plant food the larger its ratio the lower the concentration of total phosphorus in the product. Various makeshifts to produce a dry, easily handled, and free drilling product of high water-extractability which does not cake in storage or rot bags are employed abroad. My material is even more free drilling and easily handled than conventional superphosphate while high in water-extractability and in addition in true water-solubility. All American superphosphates previously made commercially so far as I know which have had high water-extractability after removal from the den have been gummy and sticky in their end product. Steps to overcome this condition have materially reduced the ratio of water-extractability. Therefore superphosphatic fertilizers of relatively high water-extractability have not been practically available in this country. (This discussion of water-extractability applies to a greater extent to normal superphosphate—(say 20% or less) made from sulphuric acid than to triple superphosphate (say about 45%) made from phosphoric acid.)

HYPOPHOSPHITE AND ITS DETECTION

Since the novel and differentiating qualities of my product and the steps to create and maintain it are clearly and fully stated herein its exact composition is of secondary importance.

The generally known phosphoric salts of calcium include the three ortho phosphates, the tri-, di- and mono-calcium phosphates, and also the pyrophosphates, the family of metaphosphates and its polymers, and hypophosphites and the phosphites. The monophosphates are soluble in water only to about .2% but decompose therein. None of the other salts is water-soluble or water-extractable to .1% or more with the exception of hypophosphite and phosphite although dicalcium phosphate very slowly decomposes. The majority of metallic salts of calcium hypophosphite are authoritatively recognized as water-soluble. Since my product alone and in combination with many metals has been shown in hundreds of tests to be truly water-soluble and to retain the H atom within the radical, hypophosphite is at least a component of my novel product or it has qualities closely corresponding thereto.

Commercial phosphoric acid and commercial phosphates made by the acidulation of natural phosphate rock are known to be mixtures of many phosphatic materials. Also conventionally-made superphosphates are mixtures of ortho- and non-ortho-phosphates with the ortho-forms predominating and with the latter largely neutral. In commercial superphosphate the predominant ortho-phosphatic form is monocalcium phosphate or dicalcium phosphate. Since my product is made from the same materials as is the conventional and contains a considerable amount of an orthophosphate it is likely that whatever ortho-phosphate is present is predominatingly of the monocalcium type since it is water-extractable. It may therefore be assumed empirically that the peculiar characteristic of my product is a combination of truly water-soluble hypophosphite, or a substance which behaves very similarly thereto, and mono-orthophosphate. That this assumption is correct is abundantly proved.

The peculiar effectiveness of my product is the result of a combination of substances rather than merely one substance. I have therefore identified the significant ions (significant elements or radicals).

Ordinarily inorganic chemical analysis is based upon reducing the constituents of an unknown compound to their elementary condition or converting them into some standard substance which can then be measured. Such analysis, however, does not reveal the characteristic ions present in the water-extract before analysis. Recently such problems have been solved by the separation of a compound into its significant constituents or ions, which may be either elementary or as in this case a radical. Thus while the identification of elements which are present does not necessarily identify the original compound, the identification of significant ions provides such identification. The most satisfactory identification of these ions is by the specific crystalline formation which is peculiar to various compounds, a procedure fully as accurate as the older technique. See "The Microscopic Characteristics of Artificial Inorganic Substances or Artificial Minerals" by Alexander Newton Winchel, Professor of Minerology and Petrology, University of Wisconsin, John Wiley and Son, New York, 1931.

When the substance to be identified is a complex and not found in any authoritative index such as that of Dr. Winchel, it must be separated into its significant ions by chemical reaction. Specific reagents when mixed with the material under test will combine with the significant ion if it is present. This crystallographic analysis is based upon the fact that any compound which will crystallize always does so under specific conditions and in a specific crystalline form exact enough for positive identification. For the technique which has been followed, see such authorities as "Handbook of Chemical Microscopy" by Emile Monnin Chamot, Professor of Chemistry Emeritus, Cornell University, and Clyde Walter Mason, Professor Chemical Macroscopy, Cornell University, John Wiley and Sons, New York, 1940.

The conditions under which crystallization takes place modify the size and dimensions of the crystal but do not change the factors which are the basis of identification by the crystallographer such as the relative angles of the crystalline faces, its index of refraction, the presence or absence of double refraction and many other equally definite characteristics. The crystal identified by the above procedure is not a crystal of the original material but one of which one significant part comes definitely from the laboratory reagent and the other part the presence of which is suspected and is proved when the crystal assumes the expected form.

CRYSTALLOGRAPHY APPLIED TO THIS INVENTION

Application of the above technique to my product is shown by Figures 19 to 34, both inclusive. Analyses of crystals formed from water-extracts of my product and of typcial conventional superphosphate were made. These findings were then employed as bases for the preparation of corroborative standards from chemically pure materials.

The crystals which are illustrated in Figures 19 to 34 both inclusive and others as indicated were made from from water-extracts of the following substances:

1. Superphosphate prepared according to this invention.
2. A standard comprising calcium hypophosphite N. F. and monocalcium orthophosphate of the order of 2 to 5.
3. A typical conventional superphosphate.
4. A standard comprising a filtered aqueous extract of a mixture made by mixing four parts of chemically pure calcium monophosphate and one part of a mixture of equal parts of chemically pure dicalcium phosphate and chemically pure calcium pyrophosphate.

The standard mixtures Numbers 2 and 4 were chosen because a preliminary crystallographic analysis of the superphosphates indicated the presence of their significant components. An analysis of my product indicated the presence therein of calcium hypophosphite and monocalcium phosphate. An analysis of several typical conventional superphosphates showed a relatively wide variation in their components, but many were found to contain calcium pyrophosphate and dicalcium phosphate in addition to monocalcium phosphate. Therefore these two materials were use in making the comparison standard against which the conventional superphosphate was checked. Calcium hypophosphite according to the National Formulary was used since no chemically pure material could be found.

Each standard extract was given an acid reaction similar to the corresponding water-extract of the superphosphates and thereupon treated with the three following recognized microreagents:

1. Ammonium molybdate.
2. Hexamine cobaltic chloride.
3. Ammonium chloride.

Figure 19:
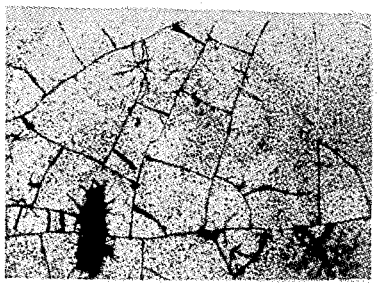
Figures 19 to 34 both inclusive are reproductions of photomicrographs each enlarged approximately 125 diameters of crystals formed from water-extracts of the various substances stated immediately hereinbelow treated by various substances as specified below.

As illustrated in Figure 19 the above extract of my superphosphate treated by ammonium molybdate yields an evaporated residue which macroscopically is pale greenish yellow transparent amorphous and presents a glassy surface which is characterized by irregular spontaneous cracks. Microscopically, the structure consists of a glassy superficial layer, characterized by irregular spontaneous cracks, superimposed upon a stratum of strongly anisotropic minute crystals.

Figure 20:
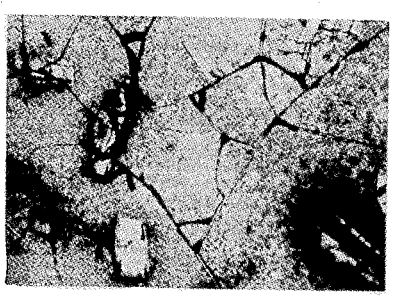

As illustrated in Figure 20 a standard of a mixture of monocalcium phosphate and calcium hypophosphite in the proportion of two parts of hypophosphite to five parts of monophosphate macroscopically presents the same appearance as the substance shown in Figure 19—greenish yellow transparent glassy and amorphous. Microscopically there is the same glassy superficial amorphous layer covering a layer of minute anisotropic crystals interspersed with isolated large anisotropic highly birefringent crystals. These larger individual crystals are the only significant difference between the specimens of Figures 19 and 20.

Figure 21:
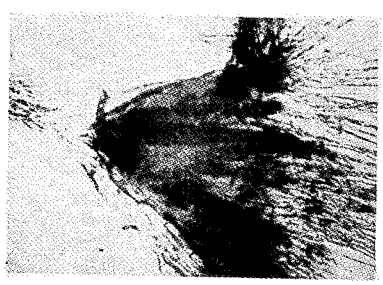
Figure 22:
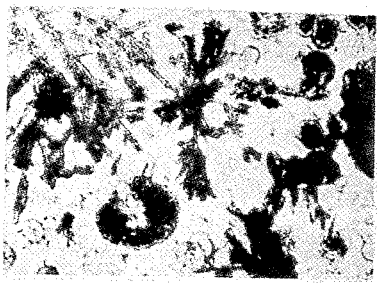
Figure 23:
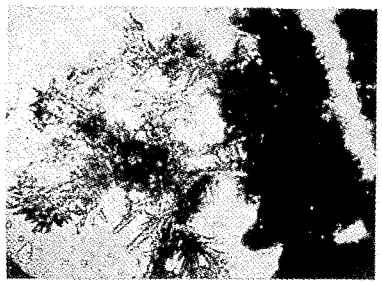

Three characteristic crystal forms from water-extract of commercial superphosphate treated by ammonium molybdate are shown in Figures 21, 22 and 23.

Figure 24:
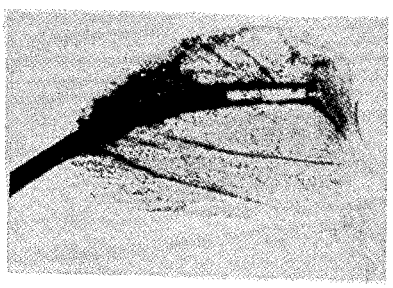
Figure 25:
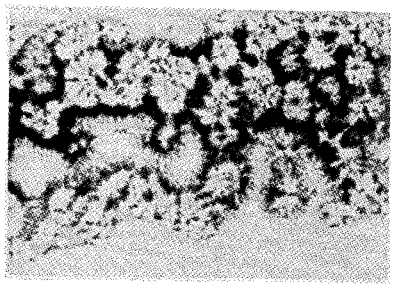
Figure 26:

A laboratory standard comprising crystals formed by treatment of a water extract of a mixture of 4 parts of chemically pure calcium monophosphate and 1 part of a mixture of equal parts of chemically pure dicalcium phosphate and chemically pure calcium pyrophosphate with ammonium molybdate are shown in Figures 24, 25 and 26 which as a group are comparable with Figures 21, 22 and 23. Each of Figures 24, 25 and 26 can well be compared with the corresponding figure to its left.

This standard shows the same three characteristics crystalline habits as commercial superphosphate treated by ammonium molybdate and illustrated in Figures 21, 22 and 23.

In Figure 21 a clustered formation of finely acicular crystals in two stages of their habit exhibit different although closely related forms. When as here the cluster is predominantly extended in one direction the effect is typical and that of a fan or feather of these anisotropic crystals.

Figure 22, taken from the same specimen as Figure 21, exhibits the second stage of this habit. In the lower part of this figure immediately left of a vertical center line a comparatively large dark ovoid object is surrounded by smaller similar ovoids visible only by their irregular dark outlines. In the right half are other similar objects some dark and some lightly outlined. All are more or less densely compacted spheroidal clusters of the same anisotropic acicular crystal. These crystals are so highly refringent that when the density of the compacted group exceeds a critical point light is so widely scattered that the needle cluster appears dark. A lighter degree of compacting shows this effect only at the termini of the individual crystals thus forming the irregular dark outline.

In the upper left portion of Figure 22 occurs a stout limbed branching crystal which is isotropic though the inclusion of minute anisotropic fragments may momentarily confuse an observer.

Figure 23 is a second and larger group of this same stout branched material. All these three illustrations come from the same physical specimen.

Figures 24, 25 and 26 show three crystal habits obtained from a single physical specimen of the standard solution consisting of an aqueous extract of a mixture of 4 parts of chemically pure calcium monophosphate and 1 part of a mixture of equal parts of chemically pure dicalcium phosphate and chemically pure calcium pyrophosphate which has been described above.

Figure 24 shows the first stage of the acicular anisotropic crystals in their unidirectional extension forming a definite feather pattern. The similarity between Figure 24 and 21 is as expected in two crystals of the same specimen. Figure 25 corresponds to the ovoid clusters of Figure 22. In Figure 25 the cluster nuclei have been brought into an aggregate through the drying of the solution upon a surface slightly water repellant. Figure 25 shows the individual needle structure more clearly than does Figure 22 and the tendency of the extremity of the individual needles to disperse sufficient light to appear dark. Therefore most of the clusters in Figure 25 compare most closely with the outline clusters of Figure 22.

Figure 26 is a typical group of the stout branching isotropic crystals which are seen in Figure 23 and to a lesser extent in Figure 22.

Instead of having a single pair of corresponding crystals in these two specimens we have three highly characteristic crystal habits in the superphosphate extract and three highly characteristic crystal habits in the mixture of dicalcium phosphate, calcium pyrophosphate and monophosphate and the three in the one case are crystallographically identic respectively with the three in the other.

The similarity between Figures 19 and 20 is clear to any trained crystallographer, as is also the close similarity between Figures 21 and 24; 22 and 25; and 23 and 26. See Figures 35 to 38 both inclusive which show the macroscopic appearance of the four substances which form the basis of Figures 19 to 26 both inclusive.

Figure 27:
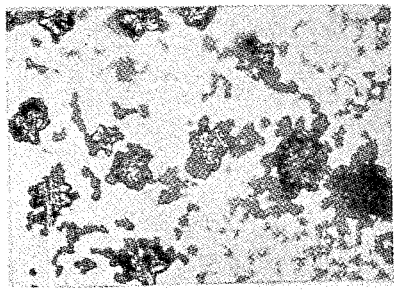

Figure 27 shows a crystal formation of a water-extract of my typical superphosphate treated by hexamine cobaltic chloride. The base of the field is made up of comparatively anisotropic colorless fusiform crystals, singly, in pairs, radiates and sheaves. Interspersed through this background are typical deformed hexagonal crystals of a distinct yellow color. These crystals are anisotropic and with low birefringence and are secondary and tertiary developments of hexagonal rosettes. The colorless crystals when grouped in sheaves and larger aggregates are so highly refractive that they scatter light outside the microscopic field giving them the appearance of dull opaque solids of irregular shape.

Figure 28:
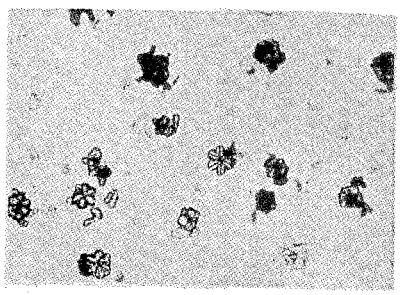

Figure 28 illustrates a standard made of a mixture of monocalcium phosphate and calcium hypophosphite treated by hexamine cobaltic chloride. The form of this crystal is less complex than that of Figure 27 but exhibits the same fundamental characteristics. The fusiform crystals of the background are not developed to the same degree as those of Figure 27 since they remain largely single, double and simple radiates. The yellow hexagonal rosettes display their fundamental form more distinctly than do those of Figure 27. Both of these fields, however, illustrate two different stages of development of practically speaking identic crystalline habit.

Figure 29:
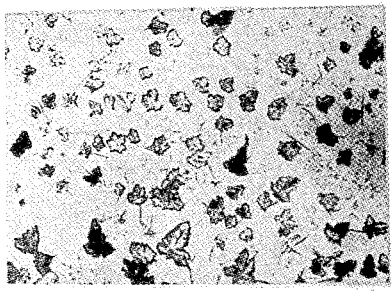

Figure 29 illustrates a standard made of a mixture of conventional superphosphate treated with hexamine cobaltic chloride. The background is made up of minute granular crystals which gradually increase in size until they form the roughly trigonal center around which the typical crystal is built. This crystal does not exhibit a definite hexagonal formation. It starts with a trigonal form which develops asymmetrically into an irregular leaf-shaped crystal with 3, 4 or 5 major limbs, hardly any forms suggesting a hexagonal symmetry. As these crystals increase in size one arm develops considerably at the expense of the others and near one end two arms at ninety degrees and almost equal in size appear. A very short arm which appears to be a continuation of the long arm completes the definite cross or dagger-shape of this typical crystal. Neither in background nor principle does this crystal resemble that of Figures 27 and 28.

Figure 30:
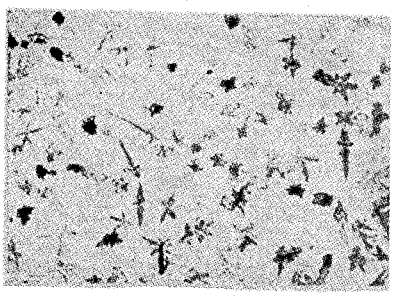
Figure 31:
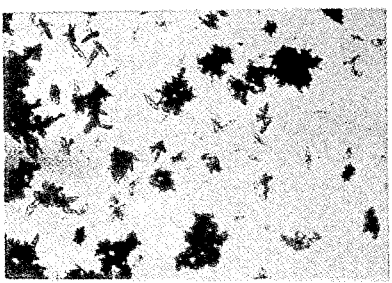

Figure 30, from a standard formed by said mixture of monocalcium and pyrophosphate and dicalcium phosphate treated by hexamine cobaltic chloride, is characterized by irregular leaf-shaped crystals and also isometric leaf forms similar to those in Figure 29 as well as a similar birefringence. The typical crystal of this group, however, is a dagger-shaped crystal much more highly developed than the crystals of Figure 29.

The four specimens illustrated in Figures 27, 28, 29 and 30 treated with hexamine cobaltic chloride divide sharply into two groups of two substances. The standard formed from a mixture of monocalcium orthophosphate and calcium hypophosphite exhibits characteristics similar to those of my product while crystallographers can see an unmistakable relation between mixtures of monocalcium and dicalcium orthophosphate and pyrophosphate and that of conventional superphosphate.

This case is typical of those often found in crystallographical analysis in which the superficial appearance of two specimens would lead a layman to assume that the materials are entirely different. To the crystallographer, however, the daggers, crosses and radiates so typically illustrated in Figure 30 are merely skeletons of crystals. When filled out by the growing crystal these skeletons assume the appearance shown in Figure 29. There are no less than four distinct skeletal types in Figure 30, all of which more highly developed clearly appear in Figure 29.

In the set shown by Figures 21, 22, 23 and 24, crystals from the same water-extracts as in the foregoing group were treated with ammonium chloride.

In Figure 21 the entire specimen, of my characteristic superphosphate, exhibits small fusiform crystals, which except for grouping in clusters have definite and uniform appearance, in singles, doubles, simple radiates, and clusters. The individual crystals are laminate and anisotropic. The clusters are so refractive that by plain (non-polarized) light they appear opaque, rough and irregular but under polarized light are seen to be complex aggregates of the crystal which characterizes the body of the specimen.

Figure 32:
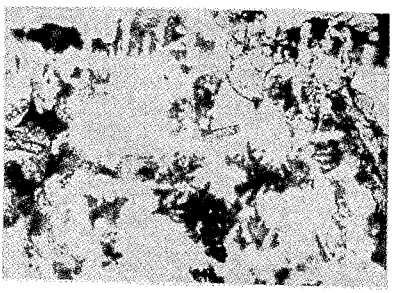

Figure 32 is a standard of a crystal formation of monocalcium phosphate and calcium hypophosphite of a ratio of the order of 2 to 5 treated with ammonium chloride. This material exhibits the highly refractile rough crystal of the reagent interspersed with translucent opaque clumps which upon examination with polarized light show to be clusters of anisotropic crystals. These crystals are more definitely rhomboid than the fusiform crystal of Figure 31 and the individual crystals are considerably smaller. Both of these conditions, however, indicate merely alternate habits of the same material since their crystallographic identity and habit of grouping are the same and the scattering of minute single and double crystals about the clusters is common to both.

Figure 33:

Figure 33 illustrates a distinctive crystal formation of conventional superphosphate treated with ammonium chloride. Upon a background of square plates is superimposed the typical ladder crystal which consists of broad irregularly swollen limbs with primary, secondary and tertiary branches all leaving the parent stem substantially at right angles with occasional deviations of ten or fifteen degrees. This crystal is isotropic. Entwined with it is a segmented linear crystal growth which branches at acute angles and is strongly anisotropic.

Figure 34:

Figure 34 illustrates a standard formed of said mixture of monocalcium and dicalcium phosphate and pyrophosphate treated by ammonium chloride. This preparation exhibits the typical square branch habit of the crystal of Figure 33 and from the standpoint of scientific crystallography is identic except that it lacks the rectangular background crystals of Figure 33. Since differences in size and formation are a characteristic of temperature and humidity of the evaporating atmosphere and the concentration of the solution it has no bearing upon identity.

Ammonium chloride is a highly active compound in crystallization. Because of the intricacy of the crystal pattern and the rapidity with which it forms, it is somewhat more sensitive to minute changes of environment than are other reagents. This characteristic gives rise to a great number of minor differences in crystal habit, caused by minute differences in environment during the process of crystallization. Nevertheless the marked similarity between Figures 31 and 32 in one case and between 33 and 34 in the other is unmistakable. This similarity, confirming the results obtained with two other reagents, emphasizes the close chemical relation existing between the average conventional superphosphate and a mixture of pyrophosphate and orthophosphate.

Figures 19 to 26 both inclusive should be considered in connection with Figures 35 to 38 both inclusive. These latter figures illustrate the macroscopic appearance of the four water-extractions presented in detail in the above figures.

Figure 35:
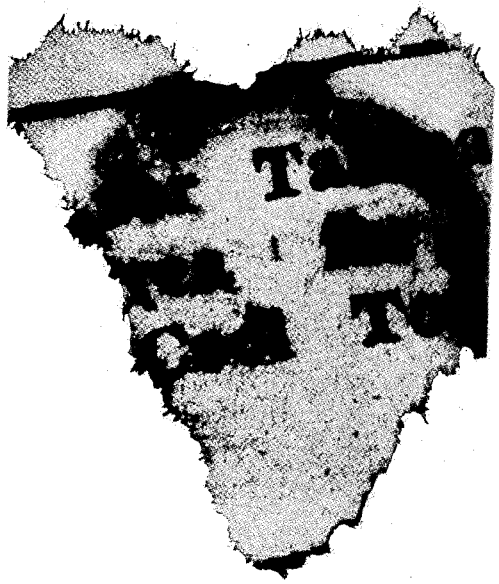
Figures 35, 36, 37 and 38 illustrate the macroscopic appearance of the four standard water-extracts which are presented in detail in photomicrographs in Figures 19 to 34 inclusive.
Figure 36:

Figure 35 shows my superphosphate treated by ammonium molybdate and corresponds to and should be considered with Figure 19. Figure 36 is a standard of a mixture of monocalcium phosphate and calcium hypophosphite in the same ratio as that stated for Figure 20 and likewise treated by ammonium molybdate and corresponds to Figure 20.

These specimens of Figures 35 and 36 are so transparent and nearly colorless that a fragment of newspaper placed beneath the dry deposit shows its density and at a glance the close similarity of composition between the two. The macroscopic composition of these specimens has been described hereinabove.

Figure 37:
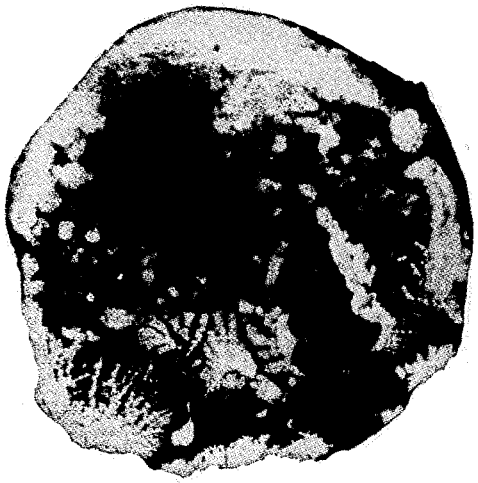
Figure 38:
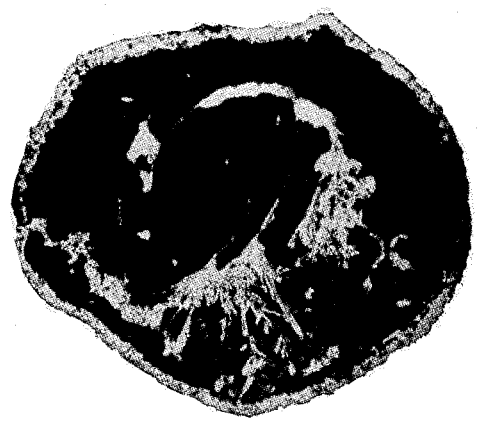

Figure 37 shows the dry residue from a water-extract of conventional superphosphate and Figure 38 a similar residue of a standard of monocalcium and dicalcium phosphate and pyrophosphate both after treatment by ammonium molybdate. Figure 37 corresponds to Figures 21, 22 and 23. Figure 38 corresponds to Figures 24, 25 and 26. Both are characterized by a white and opaque body color and granular and branching crystallization. Although the formations of Figures 37 and 38 have many characteristics in common, they have nothing in common with those of Figures 35 and 36. See also Figures 19 to 34 and the previous descriptions thereof.

DESCRIPTION OF PRODUCT

The above crystallographic descriptions and definitions herein identify my superphosphate only since the addition of other fertilizer materials entirely changes the appearance of the crystals. Also, the addition to my characteristic product even in small quantities of other forms of phosphorus, e. g. a metaphosphate or a pyrophosphate, produces a different crystal.

The name applied to the multiple substance characteristic of my product is not important since I have completely identified it and set forth exact methods for its manufacture. There is no absolutely conclusive evidence of the presence in my product of calcium hypophosphite independently of other substances, but synthetic mixtures composed substantially entirely of hypophosphite and monophosphate in the respective proportions of approximately 2 to 5 react in most cases both chemically and crystallographically in a manner closely similar to that of the water-extract of my product. My peculiar product may be considered to be either due to calcium hypophosphite or a polymerized phosphatic salt which is water-soluble and contains one or more replaceable hydrogen atoms and in other ways reacts in a manner similar to calcium hypophosphite. It is probable that either hypophosphite or a similar acting and at present unknown phosphatic salt acts in association with monophosphate, this association perhaps being a physical mixture but more likely being that of a double salt.

Therefore for all practical purposes of identification I may define the characteristic element of my product as a persistent acidic salt with one or more replaceable hydrogen atoms embodying the characteristics of hypophosphite in association with monophosphate. Whether this substance is actually hypophosphite or another acid salt such as a polymer which for all practical purposes has the same characteristics is a matter of academic interest. Therefore it is to be understood that when I employ the term "hypophosphite" or the like I refer to a salt with one or more replaceable hydrogen atoms which behaves in the superphosphatic complex and in the soil similarly to that of hypophosphite.

Speculation is unnecessary as to why my characteristic component is produced. It is clear, however, that a characteristic component of my product has less oxygen in relation to the hydrogen and phosphorus than the conventional product. My product is not oxidized or the reaction has not been complete, in the chemical not the fertilizer sense. The heat and moisture of the conventional pile, air blasts, high heat, and the like, all of which I avoid, are oxidizing agencies. The ordinary handling of superphosphate fosters the taking on of additional oxygen.

While the actual salt present in the superphosphate (before it is mixed with other fertilizing materials) is largely the calcium salt, these fundamental facts apply equally to most other cations and account for an important superiority of my product. In my superphosphate in admixture with other fertilizer materials, the ion of my characteristic salt persists but the calcium cation has been replaced by that of the added material, e. g. ammonia or potash. The calcium cation of my earlier product joins the ion of the other material, in many instances forming a substance of a greater degree of water-solubility than that previously known therefore.

A trace of a product similar to my own appears in conventional superphosphate and in products made therefrom, although in varying degrees which are greater in uncured superphosphates such as run-of-pile not intended for direct sale to and use by a farmer. Such true substances occur because accidentally previous practitioners have failed to dehydrate completely a portion of their product or to damage it by heat. Therefore in the product claims hereof I exclude a substance similar to the above in a quantity not exceeding the order of five percent of the total phosphatic (or if pertinent) metallic component thereof which is water-extractable.

Although the above crystallographic tests are undoubtedly the most accurate and satisfactory which can be applied to a compound or complex substance of the character of mine, many thousands of chemical and optical determinations confirm the above conclusions. The conventional tests for certain of the elements herein involved are inoperative in the presence of other substances commonly associated therewith.

The presence of my characteristic substance tends to render the entire complex truly water-soluble generally but not always up to the measure of the water-extractability of the compound. While probably slightly less than one-third of a water-extract of my product comes from this hypophosphite as defined above and is recognized by scientists as water-soluble, its presence renders the remainder water-extractable phosphatic complex truly water-soluble in whole or in part.

An important characteristic of my product is the presence therein of water-soluble calcium to an amount materially greater than that for which water-soluble calcium phosphate can be responsible. The water-soluble sulphur is also present in an amount indicating that both calcium and sulphur come from water-soluble calcium sulphate. These amounts materially exceed 1½ to 2% of the calcium sulphate present, the largest amount in any conventional product known to me.

THE ROLE OF METALS

Many soils are deficient in calcium in a utilizable form. Calcium materially assists in rendering other plant foods usable. Sulphur also is necessary in certain soils. Water-soluble calcium and sulphur in combination do not change the acid-alkaline balance of the soil.

Metals in association with phosphorus play a large part in this invention.

I secure and maintain an acid metallic salt including one or more hydrogen atoms whether the metal is one which is originally present in the acidulated rock, in the soil to which I apply my product, or is deliberately added to form a metallic salt which the plant can utilize. Different metals behave differently.

Iron and aluminum in the rock have long presented a most serious problem. Many rocks have been considered incapable of utilization provided these metals therein considered as sesqui-oxides have exceeded 3%. Previously the use of such rocks for acidulation has required additional acid. I make use of such rocks and from the metals therein secure in usable form constituents of great value to the plant and with less acid than conventional.

Parrish and Ogilvie in "Artificial Fertilizers," Ernest Benn, Limited, London, 1927, volume I, state clearly that while "no exception can be taken to mineral phosphates containing 2% of iron or alumina" (also stated as not exceeding 3% or 4%) presumably considered as oxides although really existing as phosphates, rocks containing larger amounts of these substances should not be employed. These authors and Schuecht, "Die Fabrikaten des Superphosphates," 1909, quoted by Parrish and Ogilvie, represent the position of the prior art that iron contained in the rock after acidulation produces approximately 2% of unattacked ferric sulphate (that is, unchanged by association with monocalcium phosphate) but beyond this point they produce insoluble ferric phosphate. Fritsch, "Manufacture of Chemical Manures," pp. 78–79, 1911, agrees with this contention. Waggaman, "Phosphoric Acid, Phosphate, and Phosphatic Fertilizers," American Chemical Society Monograph Series, Chemical Catalogue Company, New York, 1927, clearly indicates, pages 170–1, that in his opinion the only method by which a rock can be used for a physically acceptable product is by creating insoluble iron phosphate, but that even then rocks with only a minimum iron can be used.

Parrish et al. and Schuecht, as quoted by them, consider that in the acidulation operation while soluble iron sulphate perhaps does exist in a transitory phase, it reverts to an insoluble ferric phosphate thus tieing up both the iron and the phosphate in the end product. Therefore the practices of the prior art result in the creation of water-insoluble and "unavailable" iron phosphate.

Since iron phosphate is soluble in concentrated sulphuric and phosphoric acids (except the ferric form which is soluble only in sulphuric), it is probable that at some time in the conventional process of acidulating rock containing iron, soluble iron phosphate is present in a transitory phase, but when this free acid disappears so does the soluble iron phosphate. With over-acidulation, the resulting product may contain acid-soluble iron but is too sticky and wet for practical use. If such a product were neutralized or heated or otherwise dehydrated, the soluble iron would become insoluble and economic loss result.

It has been proposed to add iron sulphate to superphosphate or to apply them separately to the soil. While both materials remain sufficiently dry to make chemical action impossible, soluble iron is present but when moisture occurs the iron and phosphorus are both tied up, as indicated above. Consequently, in citrus growing areas where these metals are of particular importance and where the phosphorus or other bases of the soil quickly combine with the sulphates to form compounds in which neither phosphorus nor iron can be used by the plant my metallic phosphates are particularly valuable.

In the baking powder industry, soluble iron and aluminum phosphates temporarily present during manufacture must be removed to avoid unwanted insoluble metals in the finished calcium phosphate of the baking powder. See Jacob T. Meckstroth, "Manufacture of Phosphoric Acid and Phosphates," Chemical and Metallurgical Engineering, January 11, 1922, vol. 26, No. 2.

Also Parrish & Ogilvie and Waggaman and Easterwood and many other writers recognized as authorities in this art have held that the use of rocks high in iron and aluminum invariably results in a finished product which is sticky, gummy and otherwise difficult to handle. I am able to acidulate such rocks with the same use of acid as I require for commonly used phosphate rock. In my product both the phosphorus and the iron are available. My resulting product, without commonly used organic conditioners, instead of being sticky and gummy is free-flowing and can readily be handled and utilized by the plant.

This iron appears in the ferric and ferrous forms, both of which in my product are in part water-soluble and soluble in the acidic solution which is created by their extraction in water. I characterize this latter product as "available" since so far as known to me no "official" or other standard test for "available" iron has been recognized.

My acid-soluble or "available" iron (or other metallic) product is particularly valuable in my pellets, wherein I can indefinitely maintain this substance. No previous powdered or pelleted phosphatic product known to me of a physical condition which permits shipment or practical agricultural use has contained this substance. Conventional superphosphates usable by the farmer shows only traces of water-soluble or acid-soluble ferrous or ferric phosphorus. Run-of-pile superphosphate averages some three times that of most ordinary superphosphates. The small amount of ferrous orthophosphate originally present in conventional products is water-soluble but oxidizes. If primary ferrous phosphate appears in the products of others, under heat or extensive blasts of warm or cold air it forthwith oxidizes and changes to an insoluble form. The ferric phosphate if present in primary form is deliquescent and results in a product difficult if not impossible to handle. My product, however, is of excellent physical condition and if, as I prefer, in pelleted form the ferrous phosphate is protected from oxidation.

My products show the presence of water-soluble total iron of the average of five times that of run-of-pile and of the order of an average of three times that of total acid-soluble, the excess of iron of all forms in my product over that of ordinary superphosphate being so great that a mathematical ratio means little.

IRON IN PRODUCT AND IN SOIL

When iron is added to my complex, I have calcium hypophosphite, as previously defined, and ferric or ferrous hypophosphite, depending upon the source of the iron, or some substance which has similar chemical and crystallographic characteristics and behaves similarly thereto in the fertilizer and the soil. As with the product previously described when this substance is placed in the moist soil this $H^+$ ion remains in association with the iron and the phosphorus radical, a vital and novel characteristic of my product.

I use a lower ratio of acid to rock than is conventional practice, for example as stated by Parrish et al. and Waggaman (both above cited) and others and set out in a table later presented herein, and I secure an amount of "available phosphoric acid" substantially greater than that of other practitioners known to me. Without an excess of acid (as said by authorities above cited to be necessary) I produce and maintain in water-soluble and available forms the iron-phosphorus material which other practitioners in this art may produce momentarily but do not maintain.

A portion of my iron-phosphorus in soil water reacts with the phosphorus in the fertilizer to form an acid iron hypophosphite (defined as above) in association with a calcium hypophosphite. The H+ ion tends to maintain a portion of the resulting iron and phosphorus product in water-soluble and a portion in available forms. When such material is placed in a soil high in phosphorus the iron compounds existing in the superphosphate can be used by the plant as is very much needed in many soils. It will be understood, however, in a pellet ferrous compounds because easily extractable are preferable to the ferric.

When iron is to be added to a fertilizer in manufacture I use any iron salt which forms a soluble compound when treated as above. The sulphates are the most economical because not needing acidulation and the ferrous sulphates the most efficient because forming a larger percentage of my water-soluble ferrous product. Alternatively I can add to the mixing pan any metallic iron ore which it is economic to acidulate. When an iron-bearing material is added to a superphosphate after removal from the den, I must use one which is water-soluble and in which through double decomposition the iron will replace the calcium in the phosphorus compound.

When my product is to be used on a soil high in ferric iron I may fortify it by the addition of relatively large amounts of the ferrous form which holds a very high percentage of the phosphorus so that it can be used by the plant. I know that soluble iron in amounts as great as I have successfully used has been considered toxic but apparently this toxicity comes not from a properly prepared iron-phosphate product but from a large amount of soluble iron previously in the soil and in acid soil is in fact the inability of the plant to secure phosphorus.

ALUMINUM

Aluminum when present in phosphate rock reacts substantially as does iron and presents substantially the same problems, which I have solved. Aluminum, however, is so common in soils that there are no known deficiencies for common crops. Aluminum reacts with ordinary types of phosphorus fertilizers to form compounds which cannot be utilized by the plant while phosphorus of my type unites with aluminum in the soil to form acid salts which do not tie up the phosphorus, as is a major object of my invention.

MANGANESE

I have produced a fertilizer in which a relatively large percentage of manganese added in the form of manganese sulphate has united with the phosphorus to form an acid manganese phosphate which both in the fertilizer complex and in the soil has remained truly water-soluble and, contrary to previous experience, of excellent physical condition. This product is manganese hypophosphite as defined above. I know that water-soluble monomanganese phosphate has been produced in small quantities under laboratory conditions, but, while easily soluble in water, it quickly decomposes to the insoluble di- form. This invention produces manganese phosphate in commercial quantities and in a form which can be sold to and used by a farmer and used by the plant in the soil.

ZINC

Zinc added to fresh superphosphate forms soluble zinc phosphate, which remains in that form, according to this invention. The following analysis (Sample #26H; Wiley #154781) is illustrative of my product:

| | Percent |
|---|---|
| Water-soluble phosphoric acid | 13.43 |
| Water-soluble zinc (ZnO) | 9.36 |

Although my water-soluble zinc phosphate is of great value particularly in sandy soil, under ordinary conditions a much smaller percentage of zinc would be employed. Monozinc orthophosphate is largely insoluble in water and the di- and tri- forms wholly so.

COPPER

The use of copper under this invention for certain types of soils notably sandy is of very great value and its behavior illustrates a characteristic of my product and of its production. The addition of copper sulphate to superphosphate secures a water-soluble acid salt previously unknown, so far as I am aware.

Tests were conducted upon the basis of many water extracts of two samples, one of this product and the other of a conventional superphosphate of substantially equal "availability" (20%) of phosphoric acid content, each with the addition of a saturated solution of copper sulphate. Certain of these respective water extracts were brought to the same pH values. These tests gave additional indication that the higher acidity of my product as expressed by the lower pH value is not a result of an excess of free acid, but of the presence of my characteristic acid phosphatic salt which chiefly determines the type of reaction taking place upon the addition of metallic sulphates. More important, however, is this additional indication that the differences between my product and the conventional are based upon a striking difference in fundamental quality and not of mere difference in total acid quantity or concentration, important though such a difference is in certain phases. The degree of free acid concentration as distinct from the acidity of the acid salt although increasing the speed of reaction is less important than the peculiar chemical characteristic of the acid salt.

The addition of copper sulphate to my product creates a water-soluble acid salt of copper and phosphorus, which as defined above is a copper hypophosphite presumably cupric, which is "very soluble in water but very easily decomposed on heating." (Segerblom, above cited.) The addition of copper sulphate to conventional superphosphate changes both copper and phosphorus so that they cannot be used by a plant. Likewise, the acidulation of a copper-bearing ore such as malachite and azurite with phosphate rock produces in the end conventional product a tertiary copper phosphate but in my product a water-soluble copper phosphate.

OTHER METALS

Metals which are not now recognized as of agricultural importance but may later be found so behave similarly under this invention, notably the alkaline earth metals, barium and strontium (see later discussion of magnesium), chromium (which should be considered in connection with aluminum), cobalt and nickel (which should be considered in connection with manganese and zinc as well as iron), and cadmium. All form water-soluble hypophosphites.

Potassium and ammonium are of great agricultural importance. When ammonium hydroxide has been added to monocalcium phosphate made by others in the presence of calcium sulphate the resulting product has been monocalcium phosphate, dicalcium phosphate and sulphate of ammonia. Thus a water-insoluble phosphatic product has resulted. When alkali metals, however, have been combined with phosphorus to form acidic salts, truly water-soluble phosphates of these metals have been formed. Such water-soluble ammonium and potassium phosphates under many conditions have proved more satisfactory than water-insoluble products of phosphorus and the alkaline metals, but they lack the peculiar crop-producing quality which is novel herein and is well exemplified in my novel ammonium hypophosphite and potassium hypophosphite. I can retain these hypophosphites in the presence of dicalcium phosphate. For improvements in the handling of these alkaline metals in association with phosphorus see my said co-pending application Serial Number 222,536, filed April 23, 1951, which is a continuation-in-part of my application Serial Number 450,324 filed July 9, 1942, which is a continuation-in-part hereof and co-pending herewith. My characteristic product including these alkaline metals does not appear unless both the phosphatic portion of the end complex and the product at all stages after mixing have been handled without dehydration.

My process, therefore, make possible a fertilizer in which magnesium, phosphorus, iron and other metals exist together in water-soluble (and available) forms. I make an acid salt of magnesium and phosphorus or other metals and can maintain magnesium water-soluble in an acid (or alkaline) environment, such products and process being novel in this art.

ROCK AND ACID RATIO

In all forms of this invention I use less than conventional amounts of sulphuric or other acid to secure a given degree of "available phosphoric acid." Different grades and types of rock require adjustment of my ratio of acid to rock, but generally I use 850 pounds of sulphuric acid at 60 degrees Baumé and 60 degrees Fahrenheit to 1150 pounds of Florida pebble rock of from 68 to 75 percent B. P. L. After pelleting, I may add another 100 pounds of rock, the acid-rock ratio then becoming 850–1250. Parrish and Ogilvie and Waggaman, above cited, state that the usual ratio of acid to rock both in this country and abroad is of the order of approximately equal quantities of rock and acid at 50 degrees Baumé, which is equivalent to 921 pounds of 60 degrees Baumé and to 1150 pounds of rock.

I use conventional phosphate rock, ground to any degree of fineness which is economic and practical for a particular plant, except that the presence therein of relatively large quantities of iron and aluminum as well as other metallic impurities is not troublesome and in fact may be highly beneficial. Important objects hereof are to make available for commercial use such rocks previously considered unfit and to convert phosphorus and metals therein to persistent forms which plants can use.

Another element of saving in materials, due to the retention of the H ion in the radical, is my reduction of shrinkage from the usual 5% to a mean of 2%. I may prefer to use an excess of rock, much preferably applied to a pellet as coating thereof, to produce enough insoluble plant food to take up free acid to avoid bag rot and the like, much of such plant food particularly when pelleted becoming usable by a plant. I do not neutralize the mass of my product, although I obtain all the advantages of such a course with none of its disadvantages. Ground phosphate rock is a cheap material which in addition to serving whatever legitimate purposes a filler may have is valuable as a plant food and otherwise as herein noted.

One basis of this saving in acid is my retention of the $H^+$ ion in association with the phosphate radical when it goes into solution and a great concentration thereof in relation to the total acid content. I thereby retain as "available" and in large measure as water-soluble the phosphorus which in the processes of others is combined in "insoluble" form and hence economically and agriculturally useless. In addition, these chemical characteristics give my product a relatively great activity in the conversion of materials to soluble and other utilizable forms and their retention therein.

All fertilizer manufacturers try to avoid "reversion" or "retrogradation" of available phosphoric acid to insoluble phosphoric acid. I also avoid such reversion and also that of water-extractable phosphate to even citrate-soluble form. Where as in conventional curing process the citrate-soluble phosphate increases primarily at the expense of the water-extractable and secondarily at that of the insoluble in my product the cure increases the water-extractable primarily at the expense of the insoluble.

Another basis of my relatively more efficient use of acid is my retention as free moisture and as water of crystallization in the end product of substantially all of the moisture which was present at ex-denning. Also in mixed fertilizers from superphosphate in accordance with the full teachings hereof I maintain as water of crystallization and free moisture substantially all (say about 95%) of the moisture present at the beginning of the mixing operation, while in the superphosphate of others moisture continuously decreases from ex-denning.

COMPARISONS OF THIS PRODUCT WITH PRIOR ART SUPERPHOSPHATES

My retention of moisture bears directly upon my acid-rock ratio and interpretation of my figures in comparison with those of a conventional product.

The manipulative steps of my process with their resulting savings can best be understood by the table reproduced hereinbelow which compares the constituents of two representative samples of my product and five samples taken from publications prior to this application, as follows:

I. Sample 36 is of a pelleted uncoated superphosphate made in accordance herewith. Sample 42 is similar to 36 but with a coating of 100 pounds of rock dust applied to the pellets.

There follows an analysis (155,685) of sample 36:

|  | Percent |
|---|---|
| Moisture at 100° C | 5.60 |
| Total phosphoric acid | 20.90 |
| Insoluble phosphoric acid | .06 |
| Available phosphoric acid | 20.84 |
| Water-soluble phosphoric acid | 19.13 |

An analysis (155,686) of sample 42 follows:

|  | Percent |
|---|---|
| Moisture at 100° C | 4.50 |
| Total phosphoric acid | 21.05 |
| Insoluble phosphoric acid | .90 |
| Available phosphoric acid | 20.15 |
| Water-soluble phosphoric acid | 18.30 |

II. The analyses presented as IIA and IIB respectively are of pelleted superphosphate which has been "nodulized" by tumbling wet in a rotary drum and then dried either by direct flame or a steam jacket. In IIA the "nodulizing" step was taken twelve days after the mixing of the superphosphate. Sample IIB represents a similar product made from superphosphate two or three days old. Both the analyses were made twelve days after "nodulating."

III. Parrish et. al. above cited upon page 170 present Table XXVII covering thirteen samples illustrating practice within the United States whence comes information concerning samples IIIA and IIIB, the fourth and the eighth respectively, which represent the highest and the lowest in efficiency of rock-acid ratio.

IV. This analysis is of a pelleted superphosphate, subjected to "heat treatment" to drive off fluorine, ten thousand pounds of which in an autoclave were subjected for thirty-five minutes to steam at a temperature of 260 to 280 degrees Fahrenheit at a maximum pressure of sixty pounds. This pressure was blown off for thirty minutes and then the autoclave "vacuumized" for one-half hour, and the material dumped in piles and analyzed after forty-eight hours.

V. This analysis represents an autoclave process wherein three tons of mixture were rotated for three hours under high pressure but no heat additional to that of the mixture itself. The damp balls thus formed after twenty-four hours of curing were dried in a rotary kiln and cured in a conventional storage pile.

VI. This analysis, taken after seven days, represents the material which in an autoclave was subjected for one-half hour to sixty pounds steam pressure, which was then blown off for from three to five minutes, and the autoclave evacuated under twenty-eight inches vacuum for thirty-five minutes with the mass being stirred and heated under fifty pounds steam pressure. This sample differs from V in that in this case the heat is applied during the operation of the autoclave and not thereafter.

costs. Material costs alone under autoclave operation are much higher than for my samples 36 and 42.

This portion of the specification ignores the unique increased crop-producing capacity.

PELLETING OPERATION IN RELATION TO ACID

In this invention, the concentration of the acid is important in a subsequent pelleting operation. My closed Rock-acid relations

|  | I | | II | | III | | IV | V | VI |
|---|---|---|---|---|---|---|---|---|---|
|  | 36 | 42 | A | B | A | B |  |  |  |
| Phosphate Rock used, lbs | 1,150 | 1,250 | 1,125 | 1,125 | 672 | 672 | 100 | 100 | 100 |
| Percent P₂O₅ | 33 | 33 | 33.4 | 33.4 | 31.3 | 31.24 | ¹31.3 | ¹31.3 | ¹31.3 |
| Total lbs. P₂O₅ | 379.5 | 412.5 | 375.7 | 375.7 | 210.3 | 209.3 | 31.3 | 31.3 | 31.3 |
| Sulphuric acid used, lbs | 850 | 850 | 1,071 | 1,071 | 654 | 677 | 88 | 88 | 86 |
| At 60° Baumé | 850 | 850 | 960 | 960 | 526 | 554 | 73.7 | 73.7 | 72 |
| P₂O₅ made available | 378.4 | 394.8 | 368.4 | 365.4 | 190.5 | 193.9 | 28.57 | 28.86 | 30.05 |
| Percent of Total | 99.7 | 95.7 | 95.4 | 94.7 | 90.6 | 92.4 | 91.3 | 92.2 | 96 |
| Percent Insoluble | 0.3 | 4.3 | 4.6 | 5.3 | 9.4 | 7.6 | 8.7 | 7.8 | 4.0 |
| Lbs. Rock per Lb. Acid (60° Baumé) | 1.35 | 1.47 | 1.17 | 1.17 | 1.27 | 1.21 | 1.35 | 1.35 | 1.39 |
| Lbs. Rock to Produce 1 lb. available P₂O₅ | 3.039 | 3.166 | 3.053 | 3.072 | 3.522 | 3.46 | 3.50 | 3.465 | 3.327 |
| Lbs. 60° Acid to Produce 1 lb. available P₂O₅ | 2.25 | 2.15 | 2.005 | 2.624 | 2.76 | 2.86 | 2.58 | 2.553 | 2.39 |
| Lbs. Rock to Produce 2,000 lbs. superphosphate, 20% A. P. A. | 1,215.6 | 1,266.4 | 1,221.2 | 1,228.8 | 1,408.8 | 1,384 | 1,400 | 1,386 | 1,330.8 |
| Lbs. Unused or Reverted Rock | 3.6 | 54.4 | 56.2 | 65.1 | 132.4 | 105.2 | 121.8 | 108.1 | 53.2 |
| Lbs. 60° Acid to Produce 2,000 Lbs. superphosphate 20% A. P. A. | 900 | 860 | 1,042 | 1,049.6 | 1,104 | 1,144 | 1,032 | 1,021 | 956 |
| Cost: |  |  |  |  |  |  |  |  |  |
| Rock @ $6 per ton (33.4% B. P. L.) | $3.61 | $3.76 | $3.664 | $3.686 | $4.030 | $3.958 | $4.004 | $3.964 | $3.806 |
| Acid @ $8 per ton (60° Baumé) | $3.60 | $3.44 | $4.168 | $4.1984 | $4.416 | $4.576 | $4.128 | $4.085 | $3.824 |
| Total | $7.21 | $7.20 | $7.83 | $7.884 | $8.446 | $8.534 | $8.132 | $8.049 | $7.63 |

¹ Estimated.

All figures in the above table are actual except that the percentage of P₂O₅ in samples IV, V and VI is estimated upon the basis of the rock which was commonly used at the time these samples were prepared. To reduce these and similar figures to a common denominator, I have presented rock and acid in terms of their cost at Baltimore shortly before the filing hereof. Percentages of insoluble stated herein are upon the basis of the total P₂O₅.

An examination of the above table makes clear the fact that efficiency in the production of superphosphate depends upon four factors which must be considered jointly—rock, acid, labor and capital.

"Conversion factor" is the ratio of P₂O₅ made available to P₂O₅ present in the rock. In my uncoated sample 36 this conversion factor is 99.7, only three-tenths of one percent of all the P₂O₅ present in the rock not having been and remained converted to a form considered available in the United States. This figure of 99.7 is by far the highest of all in the above table or known to me.

In my pelleted coated superphosphate #42 this percentage of conversion was 95.7, a high figure. The acid required, however, for one pound of available P₂O₅ was 2.15 pounds while the amount for the product having a conversion factor of 99.7 was 2.25 pounds. In terms of acid, my sample 36 is the more efficient but in terms of rock my sample 42 is more efficient.

The cost of labor in the production of my pelleted coated superphosphate is less than that of the uncoated since it can be stored and handled more easily even though all precautions are taken necessary to securing my peculiar crop-producing capacity. Both labor and capital costs must be applied to the amount of product made per ton unit.

A comparison of sample VI, which is the only sample having a conversion factor even slightly higher than that of sample 42, illustrates the fourth factor—capital cost. Sample VI was made under heat and moisture evacuation in an expensive autoclave with high labor cost. My product is made by stirring in an ordinary mixer for from one to three minutes under atmospheric pressure and heating is rigorously avoided. Undoubtedly such an autoclave operation secures excellent penetration of the rock by the acid, as do the processes which result in samples IV and V, but at increased capital, labor and material pellet hereof is originally produced either fully formed—see Figure 7—or as an aggregate of several complete small pellets—see Figure 8—and not by the breaking down of a block as is my open porous pellet—see Figure 12—or the cracking of a hard mass—see Figure 11. Consequently only the original creation controls the size of my finished closed pellet, as by the amount of water in the material to be pelleted and the duration and character of agitation within a drum or the like. The larger the ratio of water to total materials to be pelleted the larger the resulting pellet other factors being equal, for example. When I start with a freshly ex-denned superphosphate the free moisture is between about nine and twelve percent. If the pellets are to be of uniform size, as is desirable, a uniform amount of water should be distributed throughout the entire, preferably by use of an acid in the original mixing operation of the concentration which furnishes the correct amount of moisture for the pellets of the desired size. The chemical activity of the mixing operation is the most practicable instrumentality known to me for carrying substantially equally to all parts of the mass an equal amount of water. Varied conditions of manufacture and greatly differing characteristics and quantities of the particular materials with which the superphosphate is mixed determine the correct amount. By a careful choice of a concentration of acid in proper relation to such materials and conditions I have found it possible to produce a total pelleted product of which 95% or more is of any reasonable and desired size, without any screening or cracking.

I am always limited to an amount of moisture not greater than that which the particular mass can utilize effectively as water of crystallization. Since I dry by crystallization, I must not add moisture which will remain after crystallization has been completed. The foregoing limits while critical are sufficiently wide so that I have always found it practicable to use acid of a concentration within the usual range of from fifty-two to fifty-six degrees Baumé. Therefore, I am able to control the size of the pellets by using a concentration which also meets ordinary economic and manufacturing considerations.

OTHER FERTILIZER MATERIALS

When I add other fertilizer materials for a so-called complete fertilizer, to the making of which my process well lends itself, I may introduce the ingredients other than phosphate rock and acid into the mixing chamber prior to the time the slurry mass is poured into the den. Muriate of potash should be added early in the mixing if it is desired to drive off the chlorine and form sulphate of potash. The end product of the block is dry and free-flowing as would not be the case were this procedure added to the ordinary den operation without the subsequent handling which I describe. Thus I carry out production on a practically continuous basis. Although others may have introduced potash-bearing materials into the mixing pan, the result has been a sticky product. My product is dry and free-flowing, whether pelleted or not.

PELLETING PROCEDURE

As clear hereinabove, I prefer to pellet superphosphate, produced as above, with or without the addition of other materials. My preferred method is to place my superphosphate hot from the den in a pelleting drum, with or without the addition of other materials, and by agitating of the mass form pellets which are then coated, heating and dehydration being avoided.

At the time the mixture has reached the pelleting machine it may be still hot and steamy, the degree depending upon the relative amount of superphosphate or other hot material, but the reaction is relatively far advanced in that it has completed the primary stage. The mixing operation as well as the production of superphosphate per se has been completed. The operation of the pelleting machine is not one of kneading nor of disintegration, since disintegration has already been accomplished by removal of the superphosphate from the den. Its sole purpose is the physical one of molding or rolling the material into small pellets. This pelleting operation is relatively short and so carried out that a relatively large volume of material is always in close physical contact.

During the course of this pelleting operation there can be practically no dehydration either by heat or by any other agency which removes the moisture which is necessary for optimum crystallization. The removal of water vapor at this time is highly disadvantageous. The application of heat or other dehydrating agency in or following a pelleting operation will defeat one of the chief aims of this invention.

SPECIAL TYPE OF AMMONIATION

I may add to the mixture as it is being pelleted a desired quantity of liquid nitrogen which has been neutralized by an acid, provided, however, that if I am to retain my peculiar crop-producing capacity this liquor contains no substantial amount of free ammonia. One preferred method is to add to an ammonia liquor a quantity of acid necessary substantially to neutralize the amount of free ammonia which the liquor contains. Phosphoric acid used as a neutralizer increases the phosphorus content. I prefer to add a mixture of acid and liquor to the other materials just before they are placed in the pelleting drum. No chemical reaction resulting in heat is caused by the mixing of this substantially neutralized ammonia liquor with even cured superphosphate, as is not true in ordinary ammoniation. If I cure the pellets as taught herein, I maintain or increase whatever degree of water-solubility of the phosphorus was present in the superphosphate when the nitrogen was added.

Alternatively I may add to the mixing pan any nitrogen solution with free or combined ammonia, provided I add sufficient acid to react with the ammonia. If the added liquor is not anhydrous, its water is a diluent of the sulphuric (or phosphoric or other) acid and the concentration employed which will give the moisture required later for optimum pelleting.

In both of these operations I am producing ammonium phosphate on the spot (or ammonium sulphate if sulphuric acid is used) in a manner which is efficient and economical at ordinary price levels for materials and does not interfere with the accomplishment of my desired results. I may add such materials as potash and ammonium salts to form a pelleted mixed fertilizer.

HYDROSCOPIC MATERIALS SUCH AS UREA

I use relatively large proportions of hydroscopic materials yielding superior plant food at a low price but hitherto unavailable for mineral fertilizers at least in desirable quantities because deleterious to the physical condition of the product.

For example, the amount of urea previously practically usable has been forty or fifty pounds to the ton of a mixed mineral fertilizer. I can include in a pellet made and coated in accordance herewith any desired quantity of urea up to 500 pounds. Similarly I may make use of such relatively large amounts of ammonium nitrate and nitrate of potash. Even in its diluted commercial form it is generally considered unsafe to include more than 60 pounds of ammonium nitrate to a ton but I can use up to 300 pounds.

Nitrate of potash alone is less hydroscopic but in many desired combinations as with urea tends to liquify. I can make satisfactory pellets from a combination of these materials up to 500 pounds per ton. Calcium nitrate and nitrate of soda are also troublesome materials of which I can make large use in my pellets.

The following illustrates a 7-12-7 formula of a very mechanically satisfactory mixed pelleted fertilizer although made of materials which if not formed into my pellets could not be drilled:

| | |
|---|---|
| 200 pounds animal tankage | 10 N. |
| 1270 pounds superphosphate | 18.5 P. |
| 210 pounds nitrate of potash | 13 N 44 K |
| 215 pounds urea | 42 N |
| 20 pounds di-ammonium phosphate | 20 N 50 P |
| 85 pounds muriate of potash | 60 K |

A less deliquescent 7-12-7 formula is:

| | |
|---|---|
| 175 pounds animal tankage | 10 N |
| 1300 pounds superphosphate | 18.5 P |
| 290 pounds urea | 42 N |
| 235 pounds muriate of potash | 60 K |

In each illustration, the animal tankage is used as coating for my pellets as later described. Although the above formula makes use of nitrogen only in organic forms it is relatively inexpensive.

There has been a rapidly increasing demand for superphosphatic fertilizers in pelleted form because of their better drillability. It was discovered, however, that certain pelleted fertilizers, particularly mixed, resulted in crop yields materially less than those secured by the same materials in powdered form. My pellets, however, in extensive tests by farmers in many parts of the United States have materially increased yields, unit for unit of phosphorus, over the best finely divided conventional fertilizers. A primary object of this invention therefore is the production of a fertilizer which maintains the great physical advantages of the pelleted form and at the same time results in relatively increased crop growth.

COMPARISON OF NOVEL PELLETS WITH PRIOR ART PELLETS

Pellets of four types should be considered:

Closed pellet

Figure 13:
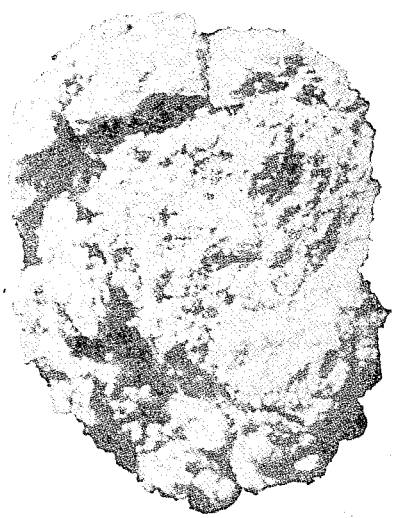
Figure 13 is a reproduction of a photomicrograph enlarged approximately thirty diameters of one of my closed pellets of the type illustrated in Figure 7 but crushed to show certain structural characteristics.
Figure 14:
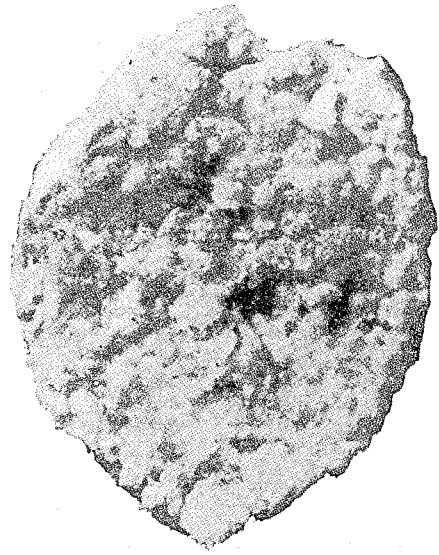
Figure 14 is a reproduction of a photomicrograph enlarged approximately thirty-five diameters showing my "closed pellet" formed of a mixed fertilizer of the formula known as 7-9-7.
Figure 15:
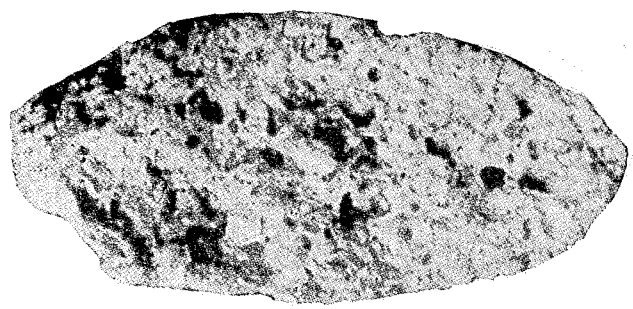
Figure 15 is a reproduction of a photomicrograph of a simple closed pellet of the type shown in Figures 7 and 13 cut substantially through the center portion to show the internal structure.

1. *Closed pellet.*—For convenience, I characterize my peculiar and novel pellet hereof as "closed" since its surface is not open but a continuous mass which does not present sensible pores. In its simple form as shown in Figures 7, 9, 13, 14 and 18 its shape is an approximation of spherical to ovoid, and sometimes angular, but subject to wide variation following details of manufacture. These closed pellets are differentiated from conventional pellets produced by fragmentation of a larger mass by the presence of a continuous closed enveloping shell which is of appreciable thickness and compact structure and internally supported by a reticulation of crystalline material in a massive glassy form. The internal mass is penetrated by numerous continuous and inter-connecting spaces such as would normally be formed following the crystallization of a heavy saturated solution confined within a limited space. Figure 15, which is a photomicrograph of a section of this pellet, shows this characteristic internal structure. Such formation is typical of that which follows the crystallization of a concentrated solution of a salt in a deep mass in a relatively deep vessel such as a crucible rather than evaporation in a usual shallow evaporating dish. Figure 13 shows a single closed pellet which has been subjected to sufficient pressure to fracture the outer shell leaving the shell fragments in their original relative positions. Figure 14 shows a section of a single pellet in which the compact shell is clearly visible enclosing the open interior reticulation. These figures illustrate how the shell is chemically bound to the interior of the pellet. Fragmentation of my pellet results in smaller masses which structurally are entirely dissimilar since this pellet is produced as an entity and not as a result of breaking of a larger mass. Such broken fragments exhibit the shell only upon a portion of their surfaces.

A plurality of small pellets may stick together as they are being formed in the pelleting drum and so make up individual aggregations each of which is an agglomeration of independent and completely individual small pellets which adhere to each other without the addition of any added adhesive substance and unite to form a larger unitary pellet. This compound pellet as illustrated in Figures 8 and 10 may be coated as the larger simple or individual pellets.

By control of the amount of moisture and the uniformity of its distribution within the mass as herein described and the stage at which I add the coating to the drum I largely control the size of the pellets both compound and simple as originally made so that no later screening operation is necessary. In the course of the pelleting process most of the pellets which are formed in an objectionably small size unite in groups to form aggregate pellets the size of which is comparable to that of the simple pellet.

If the material being pelleted is subjected to heat or dehydration, a pellet of the above physical or crop-producing capacity cannot be formed, or, if having been properly formed, it is subjected to such forces these characteristics will be destroyed.

*Open porous pellet*

2. *Open porous pellet.*—The pellet produced by the breaking-up of a block as is described and claimed in my said parent Patent Number 2,061,567 is porous, bulky and relatively soft, with "sensible" and macroscopic pores. This porosity extends throughout the pellet coming from the interior and breaking the surface. There is no differentiation of structure throughout the body of the pellet and no shell or other external differentiation. Since these pellets are formed by the fragmentation of a large mass of material, they may be further sub-divided without loss of their characteristics until fragmentation has reduced them to powder.

Figure 12:
Figure 12 is a reproduction of a photomicrograph enlarged approximately thirty diameters of the open porous pellet of the type described and claimed in my parent Patent Number 2,061,567.

When originally formed, my open porous pellets are angular, as results from the process of production, but because of their softness the angles of the pellets are quickly worn down in handling. Figure 12 shows one which has been subjected to a normal amount of handling and acquired contours similar to those of a water-worn pebble, as it would be seen by a farmer about to drill the product.

*Fired pellet*

Figure 16:
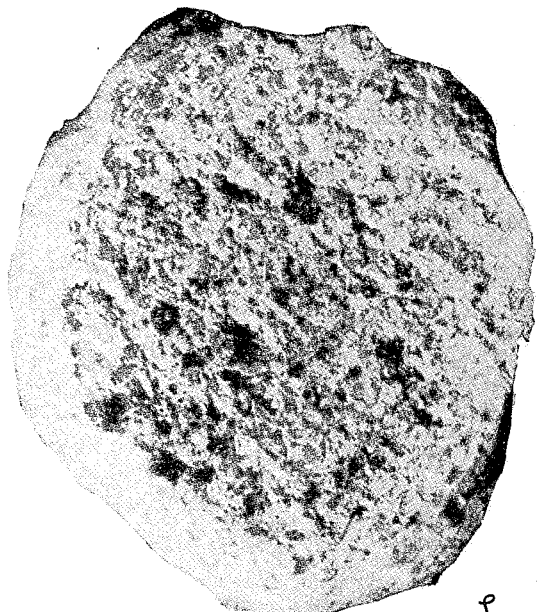
Figure 16 is a reproduction of a photomicrograph enlarged approximately thirty diameters of a conventional hard fired pellet of the type shown in Figure 11 cut through the central portion to show internal structure.
Figure 17:
Figure 17 is a reproduction of a photomicrograph enlarged approximately 175 diameters showing the interior crystalline structure of a closed pellet containg a plurality of plant foods known as 7-9-7 and corresponding to the pellet shown in Figure 14 hereof.
Figure 18:
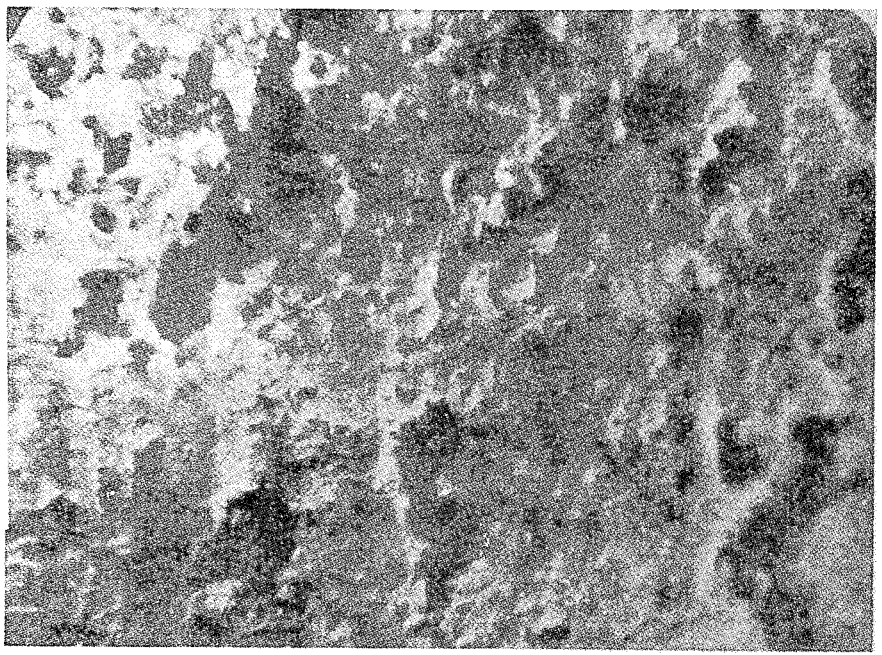
Figure 18 is a reproduction of a photomicrograph enlarged approximately 175 diameters showing the interior crystalline structure of my closed superphosphate pellet of the type illustrated in Figures 7, 8, 9, 10, 13 and 15.

3. *Conventional fired pellet.*—I illustrate one type of conventional pellet in Figure 11 to show the essentially novel characteristics of my pellets. This hard pellet is formed by heat and then by fragmentation from a larger mass. As seen in Figure 15, the structure of my closed pellet is similar to that of a mass of glass which enclosing a complex reticulation has been suddenly cooled and retains this characteristic reticulation. As shown in Figure 16, the conventional hard pellet has an internal structure comparable to that of a loaf of bread or a synthetic sponge. Instead of a reticulation it contains a large number of individual cells. Thus the recticulation of my closed pellet is a continuous interlacing with the supporting structure while the hard pellet has a continuous wall structure enclosing isolated spaces. My closed pellet of Figure 15 has been formed by the crystallization of a highly saturated solution within a limited space. The moisture has not been driven off or otherwise removed but has been utilized as water of crystallization. The conventional pellet of Figure 16 has the structure associated with the forced drying of a material aggregated in a moist state. Microscopically the texture of my closed pellet, Figure 15, is hard glassy and brittle. The texture of the conventional hard pellet, Figure 16, usually has more of a waxy nature, the substance of which tends to flow under a knife edge rather than to break. All these factors are characteristics of the different origins of the two pellets. The closed pellet is typically a product of crystallization while the conventional hard pellet is typically a product of dehydration.

In my closed pellet I can maintain in available form ninety-eight percent or more of total phosphoric acid, a critical amount which is possible only because of the availability therein of iron phosphates (and aluminum) which in the products of others, so far as I know, always become unavailable. Heating or dehydration or oxidation, which are universally practiced by others making pellets, causes the destruction of this critical amount of available phosphate from the conversion of iron phosphates.

*Other pellets of prior art*

4. *Other conventional pellets.*—Pellets, not of my characteristic types, may be formed by moistening cured or green superphosphate and then mechanically or otherwise puddling the resulting pasty mass into desired forms. Superphosphate so moistened may be extruded. Other conventional pellets are formed by dampening the superphosphate with water and then thoroughly puddling or agitating the dampened mass. Undampened superphosphate by application of great pressure may be formed into pellets.

Pellets of the above types are either fired or dried by long continued air blasts.

WATER-IRREMOVABLE SKELETON

By a "water-irremovable skeleton" for a pellet I mean what is in effect a framework which keeps the pellet from collapsing and cannot be removed by soil waters until substantially all of the water-extractable plant food has been removed. This framework is created by all substances therein which are subject to "setting" and not merely by crystallization of calcium sulphate. Preferably I make my pellets by agitating fertilizer materials consisting of or including freshly acidulated superphosphate before crystallization is completed. The setting of various salts by subsequent crystallization forms this semipermanent framework.

When a pellet with no water-irremovable body but water-removable substance is placed in moist soil it soon disintegrates. As long as the pellet retains its form, fixation can take place only on the surface because only the surface is in contact with possible fixing elements or compounds or both thereof and in the water-extract which has been carried into the surrounding soil since nowhere else is the plant food exposed to the action of the forces which cause reversion. Pellets which contain plant food which cannot be removed by soil water are of little value because none can be utilized by the plant except that which is directly attacked by root hairs which actually reach the pellet. I recognize that others have formed pellets with frameworks of water-irremovable materials. Pellets made from superphosphate and then heated or otherwise dehydrated may have highly permanent bodies but the phosphorus-bearing material associated therewith is only in part water-extractable and is water-insoluble for all practical purposes. This water-extractable but water-insoluble material if carried by soil water fixes relatively readily en route.

A great advantage of my closed pellet is its combination of water-irremovable framework that creates relative permanence of the pellet and a substance harbored by this resistant framework which not only can be carried relatively substantial distances by the water of the soil but is so carried in a form which can be utilized by the plant when it reaches it. Also a greater proportion of the contents of my closed pellets (at least ninety percent) is in water-extractable form than previously known, thereby giving them quantitative as well as qualitative advantages. Such a pellet containing hypophosphite presents very great advantages as well as novelty.

Many tests in many parts of the United States have shown that my phosphorus-bearing pellets when applied to the surface of the soil furnish this plant food which is carried by moisture throughout relatively great depths within the soil and remains in such utilizable form, while the conventional product likewise when applied as a top dressing almost instantly fixes. A portion of these advantages is not due to the pellet as such, but the pellet provides an efficient vehicle by means of which plant food may be conveniently applied and released for use over a relatively long growing season.

COATING OF NOVEL PELLETS

I prefer to apply to the surface of each pellet a water-inextractable and water-pervious coating. Such a coating preserves the identity of each pellet during manufacture and until use, increases its crop-producing capacity, and is an important step in the economy of this invention.

I preferably apply a dry absorbent coating material to the pellets in a last stage of their creation as in a pelleting drum or the like. This coating is chemically bonded to and dries the surface of each pellet and prevents one pellet from sticking to another. This coating step therefore maintains the identity of each pellet as is done by kiln drying, the application of air blasts, aeration by long continued kneading or vacuum drying by an autoclave, but with none of the great disadvantages or expense. I do not wish to "dry" the pellet as a whole in the sense of absorbing moisture therefrom, but to apply a material to the surface so that the pellets may be handled while the bulk of the free moisture becomes water of crystallization and accomplishes other stated purposes.

If the coating material, as is desirable, is neutralizing, it tends to neutralize a small amount of free acid, but only upon the surface of the pellet. Since I do not incorporate neutralizing material within the body of the pellet, I do not neutralize the fertilizer as a whole or destroy the novel acid salts which characterize my invention.

If the coating material is one which upon acidulation makes available food which may be utilized by the plant, as is preferable, the relatively small amount of free acid upon the surface tends to digest and render water-soluble and water-extractable only the interior portion of the coating but leaves the outer portion thereof water-irremovable but water-permeable. Thus my coating forms an insulation between the water-soluble and water-extractable material in the interior by separating it from intimate contact with the soil and hence prevents fixation of the phosphorus and other easily fixed materials and also much retards the rate at which the plant food is carried into the soil thus making it usable by the plant over a larger portion of the growing season. Such a coating of course must be water-permeable to permit the entrance within the pellet of soil water by means of which the plant food is extracted therefrom and carried where needed.

Ground phosphate rock is particularly desirable as a coating material. Previously raw phosphate rock has been incorporated throughout the entire body of a fertilizer mass to absorb excess acid. The step which I am describing herein is entirely novel so far as I know in that substantially finished pellets previously have not been coated with rock dust and the novel results above stated thereby obtained. I add rock dust only after agitation in a pelleting drum has largely brought the moisture— and freed acid—to the surface where it reacts with the coating material to form a chemical bond with the body of the pellet. For my preferred results the exact time at which this dust is added is critical. The addition must be so late that the agitation has formed a pellet of substantially the desired size and has brought a sufficient amount of acid and moisture to the surface to form a chemical bond with the coating material. If applied too early, the coating stops the pelleting before the pellets are really formed and the result is merely a mixture. If delayed too long, even the larger pellets agglomerate into large masses.

In such cases as I wish my pellets to contain soluble magnesium, I may coat their surfaces only by finely ground dolomite at the critical point above stated. I do not incorporate ground limestone or any other neutralizing material into the body of the pellet.

As coating material I may employ any finely divided substance of a type which could have been added to the mixing pan to have been acidulated with the phosphate rock and acid. This coating operation in its preferred form includes essentially one of acidulation. I also may apply at this critical time any of the salts of the metallic minor elements which after application persist in the presence of soil water. If one desires merely the physical benefits of coating he may use water-removable substances.

Finely ground nitrogenous or other organic materials which coat effectively may well be employed. If organic nitrogen is wanted, I prefer a material which will act as a coating and also furnish a substantial amount of plant food and not merely bulk. Finely ground cotton seed meal, soya bean meal, peanut meal, dried blood, fish or animal or garbage tankage, humus, mill by-products such as castor pomace, cocoa shells, ground tobacco stems and many more of the like may be used. These organic substances, in part water-extractable and in part water-inextractable, being upon the outside of the pellet can be readily attacked by the root hairs of the plant. They prevent the water-extractable substance from being washed from the pellet too rapidly and prevent contact between the soil particles and the water-extractable phosphorus of the interior.

The small amount of free acid on the surface of the pellet and the crystallization of the major fertilizer materials and the coating firmly bind the coating to the body. With a coating material low in available nitrogen, such as ground hoof meal or humus, the free acid makes the nitrogen much more quickly available. Thus with no additional cost, the free acid is neutralized and the nitrogen is rendered more available.

A carbon material, as bone-black or powdered charcoal, as I prefer for many purposes, partially absorbs plant foods as they are carried from the pellet by soil water thereby reducing loss by leaching. Such coating tends to correct the carbon-nitrogen balance of the soil and also to increase generation of carbon dioxide which aids in the absorption of phosphorus by plants.

A combination of charcoal and organic ammoniates is particularly advantageous for many reasons, including high absorption, color and the absence of highly neutralizing and other unwanted chemical effects. An excellent coating is a combination of raw rock dust and charcoal.

Other materials such as bone-black, bone-char, lampblack and certain of the phosphatic and potassic flue dusts may be used. Such flue dusts add plant food and neutralize acidity upon the surface of the pellet and are finely divided but at least in part are water-soluble.

CONTINUOUS RAPID PELLETING

As previously stated, I form my typical closed pellets from superphosphate, either freshly ex-denned or otherwise chemically active and moist, alone or in combination with other fertilizer materials. I am not limited to any special apparatus for forming superphosphate, but its handling after ex-denning is critical if my full results are to be secured.

Figures 1, 2 and 3 show my "continuous rapid pelleting" in a preferred manner as applied to a crane plant. As shown in Figure 1 a den 211 may be provided upon the top of which is mounted a movable platform 220 later described which supports a mixing apparatus. Ground phosphate rock is introduced into a rock receiving hopper 212 on the top of the platform and passes by a scales hopper 212' into a mixer or pan 213 into which sulphuric or other acid and water are fed in desired proportions. After the mass has been mixed conventionally, a spout or chute 214 introduces it into the den. The gas from the pan is withdrawn by a pipe 215 leading into the filling room which in turn is exhausted by a fan and a pipe not shown.

The above described mixing unit is bodily carried by a platform 220 movable upon the top of the den. Axles 222 are supported in bearings which depend from platform 220 and connect flanged wheels 223 which ride upon rails 224 on the top of the den.

In line with the den 211 but not shown in the drawings is another similar den over which the mixing structure is rolled as soon as the first den is filled. The superphosphate which has been poured in the first den is excavated therefrom while the other den is being filled.

The superphosphate may be excavated from the dens by any conventional or desired means such as is later described or by a Wenk or Sturtevant ex-denning apparatus. I can produce superphosphate for my purposes in any other desired or conventional manner or as described herein.

I remove the superphosphate from the den 211 substantially as soon as a last batch has been mixed and dumped. I then place it in a mixing chamber 225, merely a quadrilateral enclosure open at the top, shown in Figure 1 to the left of the den 211. The side walls are formed with grooves 227 into which fit removable cross partitions 228 and a lowerable leftward end wall 229. Ears 231 extend upwardly and outwardly from the body portion of each partition with openings by which they may be raised and lowered into position. The rightward end wall 230 may be fixed or movable as is later described for the end wall 229. These removable partitions thus divide the mixing chamber into a plurality of separate compartments. A hopper 232 and a conveyor 232' provide movement of the material from the mixing chamber into a pelleting machine 261.

I fill certain compartments in the mixing chamber formed between each set of removable partitions with other fertilizing ingredients which I wish to mix with the superphosphate, as for example sulphate of ammonia and potash. For example that the extreme leftward compartment A is ready to receive potash, the one B to the right has already been filled with sulphate of ammonia, and the rightward compartment C is already filled with superphosphate which has been recently removed from den 211. After the compartments have been filled, the partitions 228 are removed.

I suspend above this mixing chamber a combined digging mixing and conveying machine of the sort described and the process of which is claimed in my Patent Number 2,213,243, issued September 3, 1940, co-pending with a parent hereof. I may remove and later replace these partitions by chains attached to brackets not shown which extend laterally from the machine. After the removal of these partitions within the mixing chamber there are adjacent upright parallel strata of material the exact quantities of which are determined by the size of the respective compartments. The end walls 229 and 230 prevent the materials from flowing out. By means of this machine these materials are thoroughly mixed and broken up into relatively small particles and delivered at a uniform rate as a mixture of known proportions.

This disintegrating machine is preferably approximately of the full width and at least the full length of the mixing chamber. As described and claimed in said last-mentioned patent, it consists essentially of flights 233 which travel upon chains 234 passing over idling wheels 235 and power applying wheels 236 driven as by a motor 237 belted thereto. See Figures 2 and 3. This whole structure may be raised and lowered as by cables 238 depending from winches 239 mounted upon a U-shaped structure 240 which also supports a motor 241. This support 240 depends from an I-beam 242 which is mounted upon motor-driven wheels 243 so that the whole structure may travel horizontally upon rails 244 which are supported by I-beams 245 which join the tops of vertical columns 246. Thus revolution of motor 241 raises and lowers the digging and mixing machine and revolution of the wheels 243 moves the whole structure horizontally.

The digging machine is then lowered sufficiently far for the flights 233 to ride upon the full length of the top of the superphosphate and other material within the mixing chamber. The length and weight of the chains 234 with flights 233 are such that the portions underneath the carrier extend a considerable distance therebelow in a flattened arc so only the weight of the chains and the power applied thereto cause the flights to rake and scrape across the tops of the adjacent parallel vertical strata. Means shown in my said Patent Number 2,213,243, not shown herein prevent the machine from digging or "walking" itself out.

Any other suitable means to accomplish this result may be employed.

As shown in Figures 2 and 3, the end partition 229 (and if desired the end partition 230) must be lowered as the mixing and excavating machine is lowered. Pivoted hooks 251 depend from the chassis of the machine for engagement with ears 252 which extend upwardly and outwardly beyond the body portion of the end wall or walls. Transverse portions 253 of the hooks are placed within appropriate openings in the ears and the wall or walls and the machine descend together by gravity. After the material is entirely removed from the chamber, the machine is raised together with the wall or walls. When the walls are raised to the full heighth, latches, such as a plurality of bolts 254, are put into place, the hook 251 removed from the ears 252, the cross walls lowered into place, and the machine raised high above the chamber and moved transversely so that the compartments are ready for refilling.

As shown, the digging machine extends beyond the rightward end wall of the chamber, which therefore must be made movable as described for wall 229. If desired, however, this wall may be fixed, and the machine terminated within the cross-sectional area of the rightward portion of the chamber. Any other machine or method suitable for mixing such products and their delivery at a uniform rate may be employed.

After the mixed material has been delivered by the above-described digger or other suitable means to the chute 232 the hot and steamy mixture passes to a pelleting machine to the left. In this pelleting operation there is practically no dehydration either by heat, aeration or any other agency. A cylinder 261 is supported by rollers 262 journalled in standards 263. A motor not shown drives gearing 264 and revolves the cylinder. The slow revolution of the cylinder rolls the mixture into the form of pellets, the volume of the mixture being relatively large. This pelleting machine per se forms no part of this invention and any conventional device may be used.

Shortly before the pellets, which by this time are largely formed, arrive at the outlet of the machine, finely divided, absorptive and neutralizing material such as previously described is added to the pelleting drum as by a chute 265 leading from a hopper 266 and controlled by a slide 267. This introduction of coating material late in the pelleting operation and its restriction to the surfaces of the pellets accomplish the results previously explained. The pellets are then delivered to an elevator shown diagrammatically as 269 and form a pile 270. By means of a conventional crane the pellets may be removed from pile 270 as described hereinbelow.

A bucket 271 hangs from a chain 272 which is attached to an electric winch 273 operated by a motor 274 placed upon a car 275 which runs upon a track 276. This track 276 depends from supports 277 from I-beams 278. This beam is supported upon and operated by wheels 279 which run upon rails 280 which are supported as by horizontal I-beams 281 mounted upon upright supports 282. Motors 283 are operable to move this entire crane structure in directions at right angles to the longitudinal axis of the operative flow previously described. Only one of the main supports is shown, but the construction of the others may be similar. Any conventional crane or other excavating means may be used.

Bucket 271 moves the material delivered to pile 270 by elevator 269 to form a shallow mass or layer 287 upon a floor. The thickness of this layer should be restricted to three feet since otherwise heating may result. This layer may well be formed as described hereinafter in connection with pile 383. In a plant of normal size, a day's output will not require over much space. After five or six hours during which time the product will have largely crystallized and the heat produced thereby largely escaped, the temperature having then fallen below 100, these pellets may be moved to a pile 288 of conventional size and shape which need not be furnished with ventilation. There may be a slight momentary increase in temperature in the mass 287 but it will be too little to be important.

It will be understood that batteries of dens, mixing chambers and pelleting machines may be employed. One pelleting machine can ordinarily serve two dens and two mixing chambers.

Any other method for example as taught herein may be employed to prevent reheating or dehydration during the storage period.

MOVABLE COMBINATION DEN, MIXER AND PELLETER

There will next be described the form of my invention which for convenience may be designated as "movable combination den and mixer."

Figures 4, 5 and 6 show an embodiment in which a mixture of ground phosphate rock and an acid is directly deposited in movable dens and then with or without the addition of other fertilizer materials agitated in a novel manner to form pellets which are preferably but not necessarily coated.

A filling room 311 carries a rock-receiving hopper 312 into which ground phosphate rock is introduced and passes through a scales hopper 312' into a mixer or pan 313 into which sulphuric or other acid and water are introduced in desired proportions. The gas from the pan and the filling room is withdrawn by a pipe 315 leading into the filling room which is exhausted by a means not shown. After conventional mixing the mass is poured through a spout 316. Positioned upon a track 318 leading into the filling room is a series of special movable dens 319 into which the mass is poured. This mixing unit is disposed upon a movable platform 320 which is mounted and operated in a manner similar to platform 220 previously described. Such a den consists of a heavy cylindrical container 321 mounted upon wheels 322.

As taught in my said Patent Number 2,061,567, I may prefer to make each pouring of such quantity that it will fill the den to a depth of more than three inches. As therein taught, such thick pourings secure heat higher than that of the pan and quicker penetration of the rock particles by the acid. The limit for the total mass is determined by practical and economic considerations of a given plant. When a complete fertilizer is desired, space should be left for the later addition of other materials. I show superphosphate as a mass 323 within the car 319 within the filling room. As soon as one car is filled to the desired point it may be removed from the den by any desired means, e. g. as shown in said Patent Number 2,061,567, and an empty car substituted and filled.

Each filled car stands upon the track for any convenient period as, for example, two hours. Pelleting can be begun as soon as the material has set. The optimum time is determined by the size and other characteristics of the particular mass, which in turn are determined by the practical and economic conditions applying to a particular plant. The storage must be sufficiently limited so that the material does not set sufficiently so that optimum crystallization after pelleting cannot readily take place. Pellets of my preferred form must be created by the crystallization and not by dehydration.

For simplicity I show only one track but a plurality may be employed.

The movable den or car with the mass still hot but solidified and with the primary chemical action completed is then moved under the spouts 331, 332 and 333, through which additional measured quantities of other fertilizing ingredients, notably containing nitrogen or potash, may be added. The car is then moved upon a special movable track section 335, illustrated in detail by Figures 5 and 6. This section is supported upon a movable circular plate 336 revoluble with a shaft 337 and supported by a plurality of wheels 338 journalled as at 339 in upstanding L-shaped supports 340. A toothed rack 341 is moved by a pinion 345 which is revolved at selective speeds through a gear box 346 by a power driven shaft 347 (Figure 6). A transmission within the box 346 may be of any desired or conventional type, but I prefer an ordinary truck transmission.

To mix and pellet the mass within the movable den as it stands upon the movable track section I employ a unique device comprising paddles 348 supported by a heavy disc 349 revoluble with a shaft 350 within spaced bearings 352 and 353. These paddles have inwardly extending and dished ends 351. Pinned to this shaft is an elongated pinion 354 revoluble by a gear 355 driven by a shaft 356 driven by a motor 357. Alternatively, motor 357 and its transmission may be mounted for bodily movement with the mixing structure. The entire mixing structure associated with the shaft 350 is freely movable along the axis of the shaft 350, the two bearings 352 and 353 acting as stops at the respective limits of movement.

To permit the car or den 319 to be placed under this mixing structure, the structure is raised as by a chain 358 attached by a hook 359 to a ring 360 in the top of the shaft 350. The chain may be operated a by a hand hoist 361 and movable along the monorail 369. After the car, containing as its lower layer a mass of superphosphate still hot and steamy and if desired as its upper layer or layers other fertilizing materials, is placed underneath the mixing structure, the structure is then lowered so that the ends 351 of the paddles 348 rest upon the top of the mass. The disc supporting the car is then rotated slowly in the direction other than that in which the paddles are rotated. It will be noted that the paddles dig themselves into the mass in accordance with the resistance which they encounter. There is no downward force applied except the weight of the structure and that of the digging action which results from the angle of inclination of the leading ends of the paddles. The rate of progression is therefore self-regulating in accordance with the viscosity and resistance of the mass of a given speed of revolution.

As the mixing and pelleting operation progresses, the speed of rotation of the disc 336 and of the paddle unit should be selectively adjusted so that pellets of the desired size are formed. This continuous stirring results in the formation of pellets because of the gummy nature of the superphosphate at the time. The calcium sulphate and other materials have not yet firmly set. The paddles raise the bottom layers of material up through the upper layers and result in thorough mixing of the superphosphate with the added ingredients. For the coating, finely-divided substances previously described may be added through the spout 365 in the manner hereinbefore stated.

After completion of the coating operation, the car or den may then be moved on trestle 368 under a monorail 369 which is supported as by posts of which 370 and 371 are shown. By means of a chain 372 and hook 373 within a ring 374 attached to the car, hand hoist 361 or any convenient or conventional hoist may be employed to tip the car and dump its contents into a pile 381. This pile 381 should be relatively shallow. After substantially five or six hours a crane of any conventional type such as that shown in Figure 1 and described in connection therewith may be used to move this material, which then will have crystallized to a point that further heat from this cause will not occur, into a conventional large pile 383, a portion of which is shown broken away to indicate a method of piling which I find desirable. This pile should be formed of horizontal layers, the contents of each crane bucket being spread adjacent to but not upon the top of the contents of the previous bucket. Preferably, the bucket is opened while still moving thereby scattering each bucketfull. In this manner irregular but relatively hallow layers of small individual masses 384 will be created. By the time one layer is completed its contents will have cooled sufficiently so that another layer may be placed upon its top without causing heating or dehydration and so on until a pile of the total mass of a conventional pile shall have been formed. This system renders unnecessary the positive ventilation as provided in my ventilated pile method. I have not found it practical, however, to use this method to insure proper cooling of superphosphate of conventional fineness. Unless the material is pelleted, and preferably although not necessarily coated, my ventilated pile or some such equivalent thereof as described above must be employed if the full results of this invention are to be realized.

USE OF CURED SUPERPHOSPHATE

Although I prefer to form my closed pellets from freshly denned superphosphate, I can well utilize cured superphosphate. In the presence of a proper amount of moisture, I add other fertilizing materials, roll the mixture so formed in a pelleting drum as previously described, and preferably coat the resulting pellets. If cured phosphate is to be pelleted alone or in combination, the material to be pelleted must not be completely hydrated so that further crystallization can take place. My characteristic crop-producing component is secured only when the superphosphate meets the full teachings hereof. The moisture present during pelleting must be sufficient to permit the agitation of the mixture into pellets but insufficient completely to hydrate the calcium sulphate so that the pellets will cure sensibly dry and firm by moisture of crystallization. When I add a coating this moisture of the pelleting operation and the free acid which has been brought to the surface cause chemical activity which firmly join the coating and the body of the pellet. The amount of moisture which should be present during pelleting is determined in large measure by the particular materials which are being used and the size of the pellets wanted.

DEFINITIONS

Hereinbefore and in the claims I employ "dry" (as adjective, verb, and noun) as meaning sensibly dry or chemically dry and not as indicating a result of any dehydrating operation by driving off moisture. My "drying" does not cause a loss of total water but the disappearance to the senses of the moisture which would be otherwise be apparent. The preservation and optimum use of water, not its dissipation, are chief objects of this invention.

"Primary period" means that of the immediate reaction of acid and rock beginning in the mixer and including that after it has been formed and has set so that it can be further handled, as by disintegration, removal, mixing with other materials, or pelleting or a combination thereof.

Claims to a "cured" product or the "curing" of one should be read with the following explanation. A literal cure from a laboratory standpoint takes an indefinite period and is beyond a commercial operation. My use of such terms refers to the development of the reactions to a point at which chemical action has largely ceased, although a small amount will long continue to a slowly diminishing extent. I do not use such terms to indicate merely development to a point of apparent or actual dryness which permits mechanical handling.

I use all terms with the exact meanings which I have defined and not as previously inconsistently loosely used.

The advantages of this invention, as well as its characteristics and objects, will be evident from the foregoing specification, the attached drawings and the subjoined claims.

I claim:

1. A process of manufacturing pelleted superphosphate which comprises mixing phosphate rock and an inorganic acid, after the mixture has set and while it is still moist and warm from the mixing operation and chemically active but before it has cured forming it into pellets, and coating the pellets so formed while still moist from said mixing operation with a dry absorptive material, said coating alone being effective to preserve the identity of the pellets thereafter.

2. A process of manufacturing pelleted superphosphate which comprises mixing phosphate rock and sulphuric acid, as soon as the mixture has hardened sufficiently to hold its form agitating it to form pellets so that as the superphosphate continues to cure the skeletons formed therein by the setting of the calcium sulphate will be insoluble, coating the pellets while moist with a material which absorbs the surface moisture and maintains the identity of the pellets and forms a water-inextractable and water-pervious coating, and curing said pellets in the absence of added heat.

3. A process of manufacturing pelleted superphosphate which comprises mixing phosphate rock and inorganic acid, pouring the resulting material into a den, removing the material from the den while it is still moist, agitating the material substantially immediately thereafter to form it into pellets, drying the surface of the pellets by coating them with an absorptive material, and so handling the pellets that the temperature thereof during and after their formation decreases relatively rapidly and substantially continuously.

4. A process of manufacturing pelleted superphosphate of relatively high water-extractability which comprises mixing phosphate rock and sulphuric acid in proportions to form water-extractable phosphorus, the acid being of such a character as to cause relatively high heat in the mixture, as soon as the mixture has hardened sufficiently to hold its form agitating it to form pellets so that as the superphosphate continues to cure insoluble skeletons of calcium sulphate will be formed therein, coating the pellets while moist and chemically active with a material which absorbs the surface moisture and maintains the identity of the pellets and forms a water-inextractable and water-pervious coating, and storing the pellets so that they cool relatively rapidly without reheating thereby maintaining the high water-extractability of the phosphoric acid within the body of the pellet.

5. A process of manufacturing pelleted superphosphate which comprises mixing phosphate rock and an acid from the group consisting of sulphuric and phosphoric acids, while said mixture is hot and steamy at the end of the primary period forming it into pellets which at the completion of their physical formation have therewithin a substantial amount of moisture, coating said pellets while they are still moist and in process of formation to preserve their identity, and curing said pellets without dehydration thereby retaining the moisture necessary for the completion of the chemical reactions of the secondary period.

6. A process of manufacturing pelleted superphosphate which comprises mixing phosphate rock and an acid from the group consisting of sulphuric and phosphoric acids, pouring the mixture into a movable den, after the mixture has hardened sufficiently to hold its form agitating the mixture while still contained in the den to form it into pellets, coating the pellets while moist with an absorptive material which dries their surfaces, said coating being effective to preserve the identity of the pellets thereafter, thereafter removing the coated pellets from the den and curing them, and so handling the pellets during curing that the temperature thereof decreases relatively rapidly and substantially continuously.

7. A process of manufacturing a pelleted mixed fertilizer containing superphosphate which comprises mixing phosphate rock and an acid from the group consisting of sulphuric and phosphoric acids, after the mass has set but before curing is complete and while the mixture is still warm and moist from the primary reaction adding other fertilizer materials and substantially simultaneously forming the resulting mixture into pellets, and drying the surfaces of the pellets without added heat by coating them with water-inextractable and water-pervious material, said coating being effective to dry the surface of the pellets thereby preserving their identity thereafter.

8. A process of manufacturing a pelleted mixed fertilizer containing superphosphate which comprises mixing phosphate rock and an inorganic acid, after the mass has set but before curing is complete and while the mixture is still warm and moist and chemically active from the primary reaction adding other fertilizer materials, forming the resulting mixture while still moist into pellets in the presence only of the heat of the materials themselves, drying the surfaces of the pellets by coating them while still moist with water-insoluble and water-pervious material, and curing said pellets in the absence of added heat, said coating being effective to preserve the identity of the pellets thereafter.

9. A process of manufacturing a mixed pelleted superphosphatic fertilizer which comprises mixing phosphate rock and an acid from the group consisting of sulphuric and phosphoric acids, late in the mixing operation adding other plant food to form a mass, disintegrating this mass so formed as soon as it has hardened sufficiently, agitating the disintegrated mass while it is still hot and steamy to form pellets, during the latter portion of the pelleting operation drying the surface of the pellets by coating them with absorptive material while leaving the interior moist, and curing said coated pellets in the absence of added heat, said coating alone being sufficient to preserve the identity of the pellets thereafter and the moisture of said interior being available for optimum hydration and crystallization.

10. A process of manufacturing a pelleted mixed fertilizer which comprises mixing phosphate rock and an acid from the group consisting of sulphuric and phosphoric acids thereby forming superphosphate, before the superphosphate has cured but after it has set adding a deliquescent fertilizer material in an amount exceeding approximately ten percent of the weight of the finished product, after the mixture has set but before the curing is complete agitating the resulting mixture while still moist to form pellets with insoluble skeletons, coating the pellets with an absorptive substance so that they maintain their identity thereafter, and curing said pellets in the absence of added heat.

11. A process of manufacturing a pelleted mixed superphosphatic fertilizer which comprises making a mixture of phosphate rock and an acid from the group consisting of sulphuric and phosphoric acids thereby forming superphosphate, before the superphosphate has cured but after it has set adding a nitrogen-containing compound from the group consisting of urea, ammonium nitrate, ammonium sulphate, and calcium nitrate in an amount exceeding approximately ten percent of the weight of the finished product, after the mixture has set but before the cure is complete agitating the resulting mixture while still moist to form pellets with insoluble skeletons, coating the pellets with a finely divided absorptive substance so that they maintain their identity thereafter, and curing said pellets in the absence of added heat.

12. A process of manufacturing pelleted superphosphate which comprises forming into pellets superphosphate in chemically active condition, the surfaces of said pellets being moist, adding finely divided absorptive material to said moist surfaces and agitating to coat the pellets, thereby preserving the identity of the pellets and permitting chemical activity to continue within the pellets until cured, and curing said coated pellets in the absence of added heat.

13. A process of manufacturing pelleted superphosphate which comprises agitating run-of-pile superphosphate in the presence of sufficient moisture to form it into aggregate which treatment sets up chemical reactions in the interior of the aggregates and leaves their surfaces moist, after said aggregates are formed coating the surfaces thereof with relatively dry finely divided material while agitating, thereby forming coated pellets the coating of which is united to the aggregates by crystallization within the pellets, and thereafter curing said pellets in the absence of added heat.

14. A process of manufacturing pelleted superphosphate which comprises mixing phosphate rock and an inorganic acid, after the mixture has set and while it is moist but before it has cured forming it into pellets, and coating the pellets so formed while still moist with a dry absorptive material, said coating alone being effective to preserve the identity of the pellets thereafter.

15. The process of claim 14 which is characterized by the presence in the mixture at the time of coating the pellets of an additional fertilizer material other than a calcium phosphate.

16. The process of claim 14 characterized by the presence in the mixture at the time of coating the pellets of an additional fertilizer material comprising a water soluble metallic compound.

17. The process of claim 14 characterized by the presence in the mixture at the time of coating the pellets of an additional fertilizer material comprising a water soluble metallic compound from the group consisting of water soluble compounds of iron, manganese, zinc, copper, and aluminum.

18. As a new article of manufacture, superphosphatic fertilizer material consisting essentially of dry, free-flowing pellets produced by the process of claim 14, said pellets being characterized chemically by the fact that in contact with water of temperature not greater than about 160° F. they yield an aqueous solution of acidic phosphate salts which responds to test for hypophosphite in amount exceeding 5% of the total available phosphatic material, in association with mono-orthophosphate, and being characterized by a structure consisting of an internal mass of crystalline phosphatic material penetrated by numerous continuous spaces, a major portion of which are interconnecting, and a continuous outer coating of appreciable thickness, of water-inextractable, water-pervious material, internally supported and bonded to the internal mass, said pellets containing a skeleton which is relatively permanent and non-disintegrable in contact with soil moisture.

References Cited in the file of this patent

UNITED STATES PATENTS

| | | |
|---|---|---|
| Re. 19,825 | Ober | Jan. 14, 1936 |
| 302,266 | Liebig et al. | July 22, 1884 |
| 847,749 | Ellis | Mar. 19, 1907 |
| 1,394,532 | Barbe | Oct. 25, 1921 |
| 1,398,816 | Tuttle | Nov. 29, 1921 |
| 1,761,991 | Ober | June 3, 1930 |
| 1,837,305 | Wight et al. | Dec. 22, 1931 |
| 1,837,331 | Ober et al. | Dec. 22, 1931 |
| 1,869,879 | Balz et al. | Aug. 2, 1932 |
| 1,871,416 | Broadfield | Aug. 9, 1932 |
| 1,880,058 | Vannah | Sept. 27, 1932 |
| 1,926,492 | Luscher | Sept. 12, 1933 |
| 1,935,528 | Trumpler | Nov. 14, 1933 |
| 1,985,810 | Wight | Dec. 25, 1934 |
| 2,005,617 | Genz | June 18, 1935 |
| 2,008,469 | Prince | July 16, 1935 |
| 2,022,675 | Kriskern | Dec. 3, 1935 |
| 2,047,393 | Siems | July 14, 1936 |
| 2,057,956 | Kaselitz | Oct. 20, 1936 |
| 2,061,567 | Facer | Nov. 24, 1936 |
| 2,067,538 | MacIntire | Jan. 12, 1937 |
| 2,093,460 | MacIntire | Sept. 21, 1937 |
| 2,095,993 | MacIntire | Oct. 19, 1937 |
| 2,136,793 | Gabeler | Nov. 15, 1938 |
| 2,137,674 | MacIntire | Nov. 22, 1938 |

FOREIGN PATENTS

| | | |
|---|---|---|
| 788,981 | France | Aug. 5, 1935 |
| 7,740 | Great Britain | of 1895 |
| 12,895 | Great Britain | 1900 |
| 402,832 | Great Britain | Dec. 11, 1933 |
| 426,472 | Great Britain | Apr. 1, 1935 |

OTHER REFERENCES

Manual of Fertilizer Manufacture, published by Davidson Chemical Company, Baltimore, Md., 1946, page 75.

Mellor: Treatise on Inorganic and Theoretical Chemistry, vol. VIII, pages 883–889, Longmans, New York, 1928.

Mellor: Treatise on Inorganic and Theoretical Chemistry, vol. III, page 888, vol. VIII, pp. 879, 880, 919, vol. XIV, page 398, Longmans, Green and Co., N. Y.

Waggaman and Esterwood: Phosphoric Acid, Phosphates, and Phosphatic Fertilizers, page 141, Chemical Catalogue Co., New York.

Parrish and Ogilvie: Artificial Fertilizers, vol. 1, pages 220, 224, Van Nostrand Co., New York.

Parrish: "Artifical Fertilizers," Van Nostrand (1927), vol. I, pages 30, 31, 68–70, 140–149, 174, 203–207, 219–211.

Fritsch: "Manufacture of Chemical Manures," Scott, Greenwood and Son (1911), pages 135–6.

Waggaman: "Phosphoric Acid, Phosphates and Phosphatic Fertilizers" (1927), New York, pages 155–156, 170–176.